United States Patent
Xiao et al.

(10) Patent No.: US 11,271,907 B2
(45) Date of Patent: *Mar. 8, 2022

(54) SMART PROXY FOR A LARGE SCALE HIGH-INTERACTION HONEYPOT FARM

(71) Applicant: Palo Alto Networks, Inc., Santa Clara, CA (US)

(72) Inventors: Zihang Xiao, Los Gatos, CA (US); Cong Zheng, San Jose, CA (US); Jiangxia Liu, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 98 days.

This patent is subject to a terminal disclaimer.

(21) Appl. No.: 16/721,628

(22) Filed: Dec. 19, 2019

(65) Prior Publication Data

US 2021/0194853 A1 Jun. 24, 2021

(51) Int. Cl.
*H04L 29/06* (2006.01)
*H04L 12/26* (2006.01)
*H04L 43/028* (2022.01)

(52) U.S. Cl.
CPC ........ *H04L 63/0281* (2013.01); *H04L 43/028* (2013.01); *H04L 63/029* (2013.01);
(Continued)

(58) Field of Classification Search
CPC ............ H04L 63/0281; H04L 63/1491; H04L 43/028; H04L 63/20; H04L 63/1425; H04L 63/029
See application file for complete search history.

(56) References Cited

U.S. PATENT DOCUMENTS 5,623,600 A 4/1997 Ji
5,842,002 A 11/1998 Schnurer
(Continued)

FOREIGN PATENT DOCUMENTS

WO 2008054952 5/2008
WO 2012092251 7/2012
(Continued)

OTHER PUBLICATIONS

Yin et al., Panorama: Capturing System-Wide Information Flow for Malware Detection and Analysis, Carnegie Mellon University, Research Showcase @CMU, Department of Electrical and Computer Engineering, 2007.

(Continued)

*Primary Examiner* — Joseph P Hirl
*Assistant Examiner* — Thomas A Gyorfi
(74) *Attorney, Agent, or Firm* — Van Pelt, Yi & James LLP

(57) ABSTRACT

Techniques for providing a smart proxy for a large scale high-interaction honeypot farm are disclosed. In some embodiments, a system/method/computer program product for providing a smart proxy for a large scale high-interaction honeypot farm includes receiving tunneled traffic at a smart proxy from a sensor for a honeypot farm that is executed in a honeypot cloud, wherein the tunneled traffic is forwarded attack traffic, and wherein the honeypot farm includes a plurality of container images of distinct types of vulnerable services; selecting a matching type of vulnerable service from the plurality of container images of distinct types of vulnerable services based on a profile of the attack traffic; and forwarding the tunneled traffic to an instance of the matching type of vulnerable service.

13 Claims, 12 Drawing Sheets

(52) U.S. Cl.
CPC ...... *H04L 63/1425* (2013.01); *H04L 63/1491* (2013.01); *H04L 63/20* (2013.01)

(56) References Cited

U.S. PATENT DOCUMENTS

| | | | |
|---|---|---|---|
| 6,151,635 A | 11/2000 | Bare | |
| 6,357,008 B1 | 3/2002 | Nachenberg | |
| 6,775,780 B1 | 8/2004 | Muttik | |
| 7,370,360 B2 | 5/2008 | Van Der Made | |
| 7,409,719 B2 | 8/2008 | Armstrong | |
| 7,664,626 B1 | 2/2010 | Ferrie | |
| 7,725,937 B1 | 5/2010 | Levy | |
| 8,060,074 B2 | 11/2011 | Danford | |
| 8,151,352 B1 | 4/2012 | Novitchi | |
| 8,170,859 B1 | 5/2012 | Christensson | |
| 8,341,749 B2 | 12/2012 | Rogel | |
| 8,365,297 B1 | 1/2013 | Parshin | |
| 8,370,932 B2 | 2/2013 | Adams | |
| 8,473,931 B2 | 6/2013 | Wu | |
| 8,505,097 B1 | 8/2013 | Juels | |
| 8,533,778 B1 | 9/2013 | Dalcher | |
| 8,549,643 B1 | 10/2013 | Shou | |
| 8,555,386 B1 | 10/2013 | Belov | |
| 8,813,226 B2 | 8/2014 | Chung | |
| 8,832,836 B2 | 9/2014 | Thomas | |
| 8,898,276 B1 | 11/2014 | Pimentel | |
| 8,918,877 B1 | 12/2014 | Xie | |
| 8,954,965 B2 | 2/2015 | Novak | |
| 8,966,625 B1 | 2/2015 | Zuk | |
| 8,990,944 B1 | 3/2015 | Singh | |
| 8,997,078 B2 | 3/2015 | Spivak | |
| 9,009,823 B1 | 4/2015 | Ismael | |
| 9,021,092 B2 | 4/2015 | Silva | |
| 9,021,260 B1 | 4/2015 | Falk | |
| 9,027,135 B1 | 5/2015 | Aziz | |
| 9,038,185 B2 | 5/2015 | Livshits | |
| 9,100,428 B1 | 8/2015 | Visbal | |
| 9,104,870 B1 | 8/2015 | Qu | |
| 9,117,079 B1 | 8/2015 | Huang | |
| 9,159,035 B1 | 10/2015 | Ismael | |
| 9,165,142 B1 | 10/2015 | Sanders | |
| 9,171,160 B2 | 10/2015 | Vincent | |
| 9,176,843 B1 | 11/2015 | Ismael | |
| 9,178,900 B1 | 11/2015 | Li | |
| 9,215,239 B1 | 12/2015 | Wang | |
| 9,223,972 B1 | 12/2015 | Vincent | |
| 9,262,635 B2 | 2/2016 | Paithane | |
| 9,294,442 B1 | 3/2016 | Lian | |
| 9,336,103 B1 | 5/2016 | Hasbe | |
| 9,367,681 B1 | 6/2016 | Ismael | |
| 9,459,912 B1 | 10/2016 | Durniak | |
| 9,495,188 B1 | 11/2016 | Ettema | |
| 9,565,202 B1* | 2/2017 | Kindlund | G06F 21/567 |
| 9,602,536 B1* | 3/2017 | Brown, Jr | H04L 63/1491 |
| 9,716,727 B1* | 7/2017 | Seger | H04L 63/1491 |
| 9,736,179 B2 | 8/2017 | Ismael | |
| 9,860,208 B1 | 1/2018 | Ettema | |
| 9,882,929 B1 | 1/2018 | Ettema | |
| 9,922,193 B2 | 3/2018 | Adams | |
| 2002/0184528 A1 | 12/2002 | Shevenell | |
| 2003/0208602 A1 | 11/2003 | Bhalla | |
| 2004/0078592 A1 | 4/2004 | Fagone | |
| 2006/0010209 A1 | 1/2006 | Hodgson | |
| 2006/0018466 A1 | 1/2006 | Adelstein | |
| 2006/0021050 A1 | 1/2006 | Cook | |
| 2006/0101515 A1 | 5/2006 | Amoroso | |
| 2006/0112174 A1 | 5/2006 | L'Heureux | |
| 2006/0161982 A1 | 7/2006 | Chari | |
| 2007/0101430 A1 | 5/2007 | Raikar | |
| 2007/0208822 A1 | 9/2007 | Wang | |
| 2007/0261112 A1 | 11/2007 | Todd | |
| 2008/0098476 A1 | 4/2008 | Syversen | |
| 2008/0271019 A1 | 10/2008 | Stratton | |
| 2009/0198817 A1 | 8/2009 | Sundaram | |
| 2009/0204964 A1 | 8/2009 | Foley | |
| 2009/0241191 A1 | 9/2009 | Keromytis | |
| 2009/0288084 A1 | 11/2009 | Astete | |
| 2010/0122343 A1 | 5/2010 | Ghosh | |
| 2011/0004676 A1 | 1/2011 | Kawato | |
| 2011/0041179 A1 | 2/2011 | Staahlberg | |
| 2011/0321165 A1 | 12/2011 | Capalik | |
| 2012/0054396 A1 | 3/2012 | Bhattacharya | |
| 2012/0060220 A1 | 3/2012 | Kerseboom | |
| 2012/0192175 A1 | 7/2012 | Dorai | |
| 2012/0240236 A1 | 9/2012 | Wyatt | |
| 2012/0246724 A1 | 9/2012 | Sheymov | |
| 2012/0290848 A1 | 11/2012 | Wang | |
| 2012/0304244 A1 | 11/2012 | Xie | |
| 2012/0324446 A1 | 12/2012 | Fries | |
| 2013/0007732 A1 | 1/2013 | Fries | |
| 2013/0074186 A1 | 3/2013 | Muttik | |
| 2013/0111540 A1* | 5/2013 | Sabin | G06F 21/554 |
| | | | 726/1 |
| 2013/0117848 A1 | 5/2013 | Golshan | |
| 2013/0145465 A1 | 6/2013 | Wang | |
| 2013/0283264 A1 | 10/2013 | Bhattacharya | |
| 2013/0298221 A1* | 11/2013 | Smith | H04L 63/0414 |
| | | | 726/13 |
| 2014/0026214 A1 | 1/2014 | Adams | |
| 2014/0096229 A1 | 4/2014 | Burns | |
| 2014/0101724 A1 | 4/2014 | Wick | |
| 2014/0115706 A1 | 4/2014 | Silva | |
| 2014/0137255 A1 | 5/2014 | Wang | |
| 2014/0143536 A1 | 5/2014 | Holland | |
| 2014/0157058 A1 | 6/2014 | Bennah | |
| 2014/0201836 A1 | 7/2014 | Amsler | |
| 2014/0229939 A1 | 8/2014 | Dias De Assuncao | |
| 2014/0245444 A1 | 8/2014 | Lutas | |
| 2014/0331280 A1 | 11/2014 | Porras | |
| 2014/0337836 A1 | 11/2014 | Ismael | |
| 2014/0351934 A1 | 11/2014 | Mitra | |
| 2014/0366017 A1 | 12/2014 | Krten | |
| 2014/0380474 A1 | 12/2014 | Paithane | |
| 2015/0058983 A1 | 2/2015 | Zeitlin | |
| 2015/0067805 A1 | 3/2015 | Martin | |
| 2015/0067862 A1 | 3/2015 | Yu | |
| 2015/0096025 A1 | 4/2015 | Ismael | |
| 2015/0199343 A1 | 7/2015 | Dabak | |
| 2015/0220735 A1 | 8/2015 | Paithane | |
| 2015/0244730 A1 | 8/2015 | Vu | |
| 2015/0248554 A1 | 9/2015 | Dumitru | |
| 2015/0326588 A1 | 11/2015 | Vissamsetty | |
| 2015/0326599 A1 | 11/2015 | Vissamsetty | |
| 2016/0004869 A1 | 1/2016 | Ismael | |
| 2016/0042179 A1 | 2/2016 | Weingarten | |
| 2016/0080415 A1 | 3/2016 | Wu | |
| 2016/0149950 A1 | 5/2016 | Ashley | |
| 2017/0093910 A1* | 3/2017 | Gukal | H04L 63/1425 |
| 2017/0149825 A1* | 5/2017 | Gukal | H04L 63/1491 |
| 2017/0185779 A1 | 6/2017 | Adams | |
| 2017/0230336 A1* | 8/2017 | Bingham | H04L 63/1491 |
| 2017/0364794 A1* | 12/2017 | Mahkonen | H04L 43/10 |
| 2017/0366610 A1 | 12/2017 | Martin | |
| 2020/0389469 A1* | 12/2020 | Litichever | H04L 63/1425 |

FOREIGN PATENT DOCUMENTS

| | | |
|---|---|---|
| WO | 2012092252 | 7/2012 |
| WO | 2013067505 | 5/2013 |
| WO | 2013067508 | 5/2013 |

OTHER PUBLICATIONS

Baecher et al., The Nepenthes Platform: An Efficient Approach to Collect Malware, RAID 2006, LNCS 4219, pp. 165-184, 2006.

Blasing et al., An Android Application Sandbox System for Suspicious Software Detection, 2010.

Ceron et al., MARS: An SDN-Based Malware Analysis Solution, 2016 IEEE Symposium on Computers and Communication (ISCC), Aug. 2016, pp. 1-6.

Chen et al., Towards an Understanding of Anti-Virtualization and Anti-Debugging Behavior in Modem Malware, 2008.

(56) References Cited

OTHER PUBLICATIONS

Curtis R. Taylor, Leveraging Software-Defined Networking and Virtualization for a One-to-One Client -Server Model, Worcester Polytechnic Institute, May 2014, pp. 1-18.
Garfinkel et al., Compatibility is Not Transparency: VMM Detection Myths and Realities, Mar. 2, 2014.
Hecker et al., 'Automated Honeynet Deployment for Dynamic Network Environment', IEEE, Jan. 7-10, 2013, 2013 46th Hawaii International Conference on System Sciences, pp. 4880-4889; <http://ieeexplore.ieee.org/stamp/stamp.sp?tp=&arnumber=6480433>.
Jiang et al., "Catching Synchronized Behaviors in Large Networks—A Graph Mining Approach", Jun. 2016. ACM, pp. 35:1-35:27; <http://dl.acm.org/citation.cfm?id=2746403&CFID=832422238&CFTOKEN=7853- 7204>.
Jiang et al., Stealthy Malware Detection Through VMM-Based 'Out-of-the-Box' Semantic View Reconstruction, 2007.
King et al., SubVirt: Implementing Malware with Virtual Machines, 2006.
Kotheimer et al., "Using Honeynets and the Diamond Model for ICS Threat Analysis", May 2016, Technical Note, CMU-SEI-2016-TR-006, Carnegie Mellon University, pp. 1-30; <https://resources.sei.cmu.edu/asset.sub.-files/TechnicalReport/2016.- sub.--005.sub.--001.sub.--454247.pdf>.
Provos et al., Virtual Honeypots: From Botnet Tracking to Intrusion Detection, Pearson Education, 2007, ISBN 10:0-321-33632-1.
Roger A. Grimes, Honeypots for Windows, Apress, 2005, ISBN 1-59059-335-9.
Sysdig, Introducing Falco: Open Source, Behavioral Security from Sysdig, downloaded Dec. 12, 2019 pp. 1-5.
Vadrevu et al., MAXS: Scaling Malware Execution with Sequential Multi-Hypothesis Testing, Asia CCS'16, May 30-Jun. 3, 2016, pp. 771-782.
Wang et al., "Against Double Fault Attacks: Injection Effort Model, Space and Time Randomization Based Countermeasures for Reconfigurable Array Architecture", vol. 11, No. 6, Jun. 2016, IEEE, pp. 1151-1164; <http://ieeexplore.ieee.org/stamp/stamp.jsp?arnumber=7383285>.
Author Unknown, The Honeywell Project, Know Your Enemy: Learning about Security Threats, Second Edition, Addison Wesley, 2004, ISBN 0-321-16646-9 *Book submitted*.

\* cited by examiner

SMART PROXY FOR A LARGE SCALE HIGH-INTERACTION HONEYPOT FARM

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
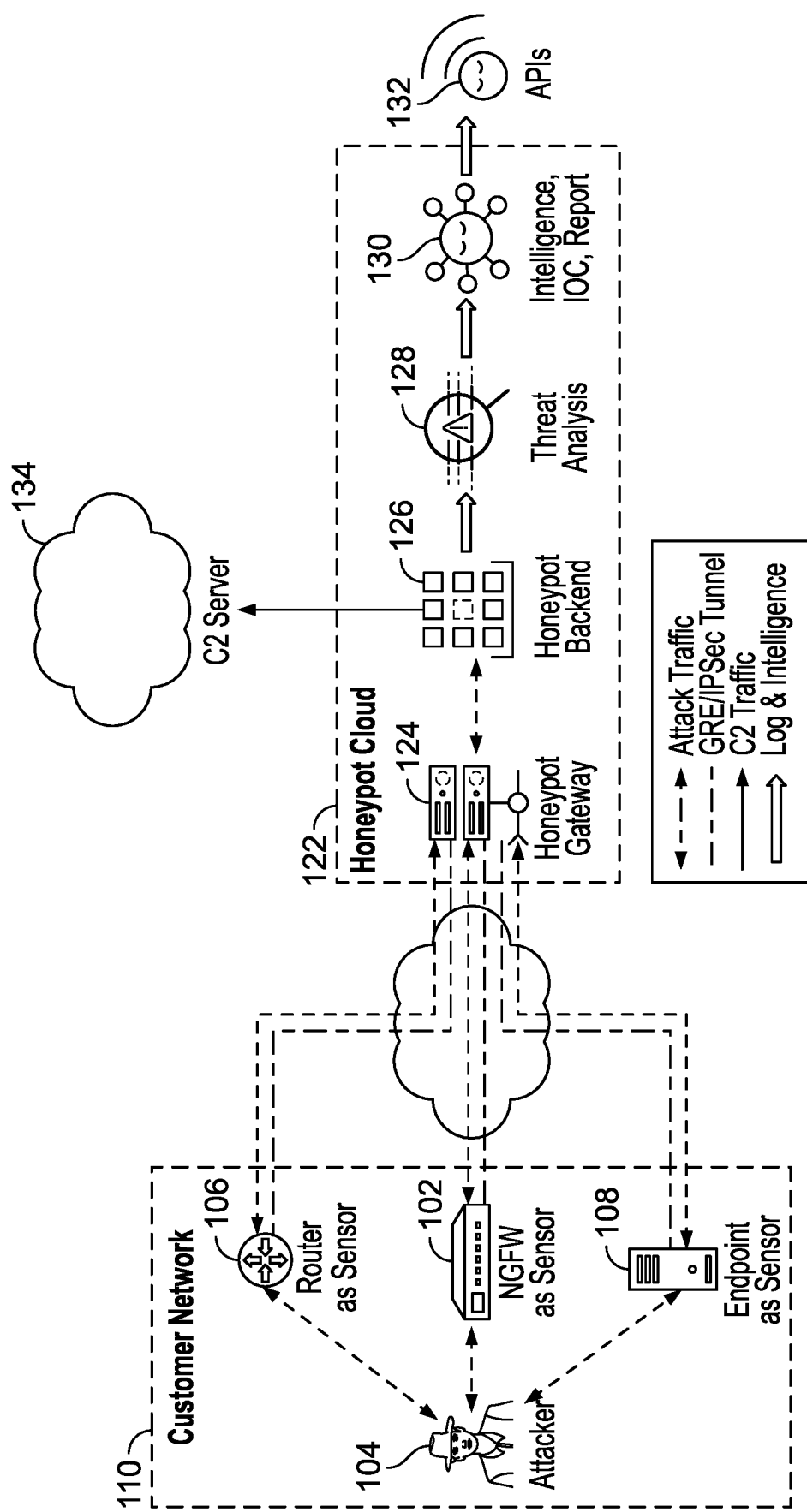
FIG. 1 is a diagram of a system architecture for a large scale high-interactive honeypot farm in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, antimalware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Dynamic Analysis for Advanced Threats

A significant challenge for security detection techniques is to identify threats (e.g., malware, which refers to malicious programs, such as programs attempting to perform malicious or undesired actions) attempting to use new exploits, such as zero-day threats that have not previously been identified (e.g., targeted and unknown threats). For example, a new zero-day threat and/or an advanced threat, such as an Advanced Persistent Threat (APT) (e.g., technically advanced adversaries that employ various techniques using malware to exploit vulnerabilities in systems and often using an external command and control (C&C) for continuously monitoring and extracting data from a specific target, often using stealthy, persistent methods that can evade traditional security measures, such as signature-based malware detection measures) that has not previously been identified (e.g., for which no signature yet exists) can exploit new or unresolved vulnerabilities in an application or operation system of a device (e.g., a client device, a server, an appliance, a networking device, a printer, and/or other types of computing devices).

In particular, modern attackers are increasingly using targeted and new unknown variants of malware to avoid detection by traditional security solutions. For example, advanced security threats (e.g., advanced cyber-attacks) are employing stealthy, persistent methods to evade traditional security measures. Skilled adversaries (e.g., attackers) demand that modern security teams re-evaluate their basic assumptions that traditional intrusion prevention systems, antivirus, and single-purpose sandbox appliances are up to the task of defeating advanced security threats, such as APTs.

To address this, new and improved techniques are needed to efficiently and effectively identify such new and evolving advanced threats. For example, by executing suspect files (e.g., malware samples) in a virtual environment (e.g., an instrumented virtual environment, which is sometimes also referred to as using a sandbox analysis of malware samples that can be instrumented with various user level and/or kernel level hooks for monitoring behaviors of programs executing and/or monitoring various network activities, which can be unknown threats) and observing their behavior, such malware can be quickly and accurately identified, even if the malware sample has not been previously analyzed and detected.

Once a file is deemed malicious (e.g., a malware sample is deemed to be malware), protections can be automatically generated using, for example, a cloud security service (e.g., implementing a dynamic security analysis of malware samples in a scalable cloud-based, virtual environment to directly observe the behavior of potentially malicious malware and exploits) to be delivered to subscribers of the cloud security service (e.g., within minutes or hours of detection). For example, such techniques can also be used to forensically determine who/what was targeted, including the application used in the delivery, any Uniform Resource Locator addresses (URLs) that were part of the attack, and/or other aspects (e.g., when an unknown threat is discovered, techniques disclosed herein can automatically generate protections to block the threat across the cyber kill-chain, sharing these updates with subscribers of the cloud security service within minutes or hours of detection, such that these quick updates can stop rapidly spreading malware, as well as identify and block the proliferation of potential future variants without any additional action or analysis). As disclosed herein, the cloud security service identifies unknown malware and zero-day exploits by directly executing them in a scalable cloud-based, virtual sandbox environment (e.g., an instrumented virtual environment (also referred to herein as a virtual machine (VM) environment), which is provided by commercially available cloud security services, such as WildFire offered by Palo Alto Networks, Inc., and/or on-premises based implementations of such cloud security services, which provide for dynamic analysis to identify and block unknown threats). In one embodiment, the cloud security service automatically creates and disseminates protections in near real-time to help security teams meet the challenge of advanced security threats. In an example implementation, the cloud security service extends the next-generation firewall platform that natively classifies all traffic across many different applications, and the cloud security service can apply a behavioral analysis regardless of ports or encryption, including full visibility into web traffic, email protocols (SMTP, IMAP, POP), FTP, SMB, and/or other protocols to facilitate detection and dissemination protections in near real-time to respond to such advanced security threats.

However, existing techniques for using an instrumented virtual machine (VM) environment can be detected by a skilled attacker, because the attacker may be able to detect whether their malware is executing in the target host and/or target network environment or in a VM environment (e.g., sandbox for security analysis). For example, existing sandbox approaches to malware detection typically only install one version of software (e.g., applications or other software) per virtual machine instance. As another example, some other existing approaches execute multiple virtual machine (VM) instances with different software configurations (e.g., in which such multiple VM instances can be executed sequentially or simultaneously in a VM environment). Regardless, such approaches fail to synchronize various different attributes associated with a target host and the VM instance(s). Moreover, such approaches fail to emulate other devices in the VM environment, such as devices that the target host can communicate with in the target network environment (e.g., a network printer, a file share/server, a DNS server, an email server, a proxy server, other client devices, and/or other devices/services in the target network environment).

As such, current approaches to implementing VM environments for providing malware detection and security analysis generally perform analysis of discrete events (e.g., downloading of potential malware—a malware sample) and any subsequent activity in a stand-alone sandbox (e.g., in which a stand-alone sandbox is typically executing one or more VM instances using fixed configurations, which can be implemented using a cloud solution and/or appliance-based solution). For example, existing approaches only attempt to emulate a single host, which may be allowed to have external Internet access but do not allow for local network communications in the local target network. Further, such approaches typically only allow for a limited analysis time (e.g., 1 to 5 minutes of execution time using the VM instance executed in the instrumented VM environment), which fails to provide for a realistic environment. For example, APT attacks are usually over a longer period of time and performed by a more skilled attacker who would typically be attempting a targeted attack (e.g., directing malware and/or communications to a targeted host) such that such an attacker would often be able to detect that the VM instance does not have the previously observed and/or expected attributes associated with the target host. As another example, an attacker attempting an APT attack typically targets a host in a target network and, thus, expects to see other devices in a network environment that can be in communication with the target host (e.g., in some cases, based on prior reconnaissance of the target network environment by the attacker, such as based on logs and/or local configuration data on the target host and/or network scans of devices on the target network environment, such as using Nmap or other network scanning tools).

Honeypot solutions exist and attempt to capture live attacks on the Internet or within an intranet (e.g., enterprise network). Generally, there are two types of honeypots: low-interaction (e.g., minimally interactive honeypots, also referred to herein as low-interactive honeypots) and high-interaction honeypots (e.g., highly interactive honeypots, also referred to herein as high-interactive honeypots). Low-interaction honeypots can more easily be bypassed and generally are not designed for capturing advanced attacks and/or vulnerability exploits. High-interaction honeypots are typically more desirable as such are generally designed for capturing advanced attacks (e.g., APT attacks) and/or vulnerability exploits.

However, to build a high-interaction honeypot, a specific network service or customized version of an existing implementation of that service would generally have to be implemented, which requires a significant amount of time and resources to implement effectively. Further, a high-interaction honeypot typically can only handle a relatively small portion of traffic that a honeypot entity (e.g., a honeypot sensor/frontend or other device/service implemented to perform the honeypot entity functions to emulate a particular target device/service) actually received, while most of the incoming potential probing/attacking traffic would typically be discarded (e.g., because they are invalid to the service behind the honeypot). In addition, both types of honeypots (e.g., low-interaction honeypots and high-interaction honeypots) typically only output captured traffic and event logs. As such, additional techniques would typically have to be implemented to effectively and efficiently analyze the traffic and the logs on a case-by-case basis to identify a successful attack/compromise.

As a result, existing approaches to implementing VM environments for security analysis are insufficient to overcome various anti-VM techniques used by attackers or unauthorized users that can detect whether or not their malware is executing in a VM environment and/or whether their communications have been redirected from a target host to a VM instance in the VM environment. In particular, typical VM environments for security analysis fail to provide a realistic emulation of a target host/service that would be expected by skilled attackers, such as an attacker attempting to perform an APT attack on a target host in a target network environment (e.g., as such an attacker would typically have examined that host in the network environment to some extent in the past and, thus, would be able to compare such to the VM instance in the VM environment and likely be able to determine that such is not the actual target host in the network environment and/or various anti-VM techniques can be used by the attacker to infer the presence of a sandbox environment). As a result, the attacker would typically not expose their full set of malicious tactics, techniques, and procedures (TTP) and/or would terminate their attack once the VM environment is detected or suspected. As a result, inadequate and insufficient competitive intelligence (e.g., adversary intelligence against such APT attacks and attackers) can be gained using existing approaches to implementing VM environments for security analysis.

An example APT attack pattern can be initiated by an attacker with a phish directed to a target user/target host, such that an exploit can be identified on the target host, and then a dropper can be used to install malware on the target host that can utilize the exploit to install a rootkit on the target host. At this point, the attacker can use various tools executed on the target host via remote control (e.g., command and control (C&C) activities, in which the attacker is typically operating a device that is remote from the target host and remote from the target network environment). Such attacks can utilize a variety of phishing attacks and/or malware to attempt to avoid initial detection (e.g., evading firewall detection based on signatures and/or various other heuristics or other techniques that can be provided by perimeter and/or host-based security approaches). Also, as discussed above, existing, standalone VM environment approaches rarely would be able to observe an entire APT process (e.g., such as the above-described example APT attack pattern) as such are typically only executed in a VM environment for a short period of time (e.g., 1-5 minutes), and anti-VM techniques would often be used by APT attackers to determine that such is a VM environment (e.g., by detecting that the malware/rootkit is not executing on the target host and/or the device is not in the target network but rather is executing in a standalone VM environment, such as a sandbox environment, as similarly discussed above).

Other existing approaches have attempted to use existing honeypot approaches, such as honeypot projects and commercial attempts that deploy honeypots using a virtual server(s) inside of an enterprise network. These honeypot approaches assume that whoever is knocking at the door is an attacker, which generally catches noisy unskilled, opportunistic attackers that scan the network and attempt to communicate with arbitrary hosts discovered during the scanning process. However, existing honeypot approaches are typically not effective against various advanced threats, such as APT attacks, because as similarly discussed above, skilled adversaries can generally detect when they are in a standalone VM environment (e.g., based on attributes of the VM instance executed in the VM environment) and/or are not in the actual target network environment (e.g., which should typically have other endpoints, such as other hosts including clients and servers, printers, and/or various other devices/services expected or known by the attacker to be present in the target network environment).

Existing honeypot approaches generally are associated with a significant maintenance complexity, are technically challenging to deploy and to keep stable and running for an extended period of time, and typically do not scale well (e.g., to scale from 10× or more sensors). Existing honeypot approaches are also generally easily bypassed (e.g., defeated with fingerprinting or probing) and generally fail to facilitate an interaction with an attack for multiple stages.

As such, there is a significant technical challenge in providing a honeypot environment that is both highly interactive and at large scale to facilitate simulating the ever increasing number of vulnerabilities and services/devices being targeted and exploited in the wild (e.g., including emerging Internet of Things (IoT), such as targeting IoT devices including routers, cameras, smart TVs, DVRs, and/or other IoT devices, and Linux servers on the Internet or public cloud, data center, etc. with services including Hadoop, Drupal, WebLogic, databases, and/or other services). Example threats include botnet (e.g., Mirai, Satori, and Reaper), worms (e.g., TheMoon), DDoS (e.g., Memcached Reflection DDoS), coin mining (e.g., Xbash and ADBMiner), traffic sniffing and hijacking (e.g., VPN-Filter (APT operation)), DNS hijacking (e.g., GhostDNS), ransomware (e.g., StorageCry), spam (e.g., BCMUPnP Hunter), backdooring, and information stealing.

Another significant technical challenge is that the existing honeypot approaches typically generate too much noise in the logs. For example, it is difficult to produce high quality actionable intelligence from such noisy logs.

Thus, what are needed are new and improved virtual machine (VM) techniques for advanced security threats.

For example, techniques described herein can be used to provide more effective advanced threat prevention using an instrumented VM environment. In addition, techniques described herein can also facilitate competitive intelligence gathering of such advanced threats or other sophisticated attacker attacks using an instrumented VM environment as further described below.

Techniques for a Large Scale High-Interaction Honeypot Farm

Accordingly, various techniques for providing a large scale high-interaction honeypot farm are disclosed.

In some embodiments, a system/method/computer program product for providing a large scale high-interaction honeypot farm includes sending traffic detected at a sensor to a proxy (e.g., a smart proxy, such as further described below) for a honeypot farm that is executed in a honeypot cloud, wherein the traffic is forwarded attack traffic that is sent using a tunneling protocol, and wherein the honeypot farm includes a plurality of container images of distinct types of vulnerable services; selecting a matching type of vulnerable service from the plurality of container images of distinct types of vulnerable services based on a profile of the attack traffic; forwarding the traffic to an instance of the matching type of vulnerable service; and executing a security agent associated with the instance of the matching type of vulnerable service to identify a threat by monitoring behaviors and detecting anomalies or post exploitation activities.

In addition, various techniques for providing a smart proxy for a large scale high-interaction honeypot farm are disclosed.

In some embodiments, a system/method/computer program product for providing a smart proxy for a large scale high-interaction honeypot farm includes receiving tunneled traffic at a smart proxy from a sensor for a honeypot farm that is executed in a honeypot cloud, wherein the tunneled traffic is forwarded attack traffic, and wherein the honeypot farm includes a plurality of container images of distinct types of vulnerable services; selecting a matching type of vulnerable service from the plurality of container images of distinct types of vulnerable services based on a profile of the attack traffic; and forwarding the tunneled traffic to an instance of the matching type of vulnerable service.

In an example implementation, the large scale high-interaction honeypot farm includes a smart proxy. For example, the smart proxy can be implemented using a layer-3 tunnel or a layer-4 proxy (e.g., using a Generic Routing Encapsulation (GRE) tunnel, an Internet Protocol Security (IPSec) tunnel, and/or another type of tunnel). Live traffic (e.g., live attacking traffic generally refers to network traffic that includes malicious network activity associated with malware or potential malware/APT activity as described below with respect to various embodiments) from sensors deployed on the Internet and/or an Intranet, such as an enterprise network is forwarded to the smart proxy, which is further described below with respect to various embodiments.

For example, the smart proxy receives the forwarded live traffic (e.g., forwarded live attacking traffic that includes certain bytes of payload of the network traffic from an attacker, such as further described below). In one embodiment, the smart proxy performs Deep Packet Inspection (DPI) of the network traffic to determine the types of computing environments and/or dependencies (e.g., network protocols, specific server programs, application framework/runtime/middleware, applications, device types, specific vulnerable computing environments, and/or other types of computing environments and/or dependencies) that are being sought by the attacking traffic. Example types of types of computing environments and/or dependencies include network (layer-7) protocols (e.g., HyperText Transfer Protocol (HTTP), File Transfer Protocol (FTP), Server Message Block (SMB) protocol, and/or other types of network protocols), specific server programs (e.g., Apache, GoAhead, Redis, and/or other types of server programs), application framework/runtime/middleware (e.g., Tomcat, Struts2, PUP, and/or other types of application framework/runtime/middleware), applications (e.g., Drupal, phpMyAdmin, Jenkins, and/or other types of applications), specific Internet of Things (IoT) devices (e.g., a Netgear router, a wireless security camera such as a Nest camera, and/or other types of (IoT) devices), and specific vulnerable computing environments (e.g., ShellShock, Drupalgeddon, and/or other types of (vulnerable) computing environments). For each set of forwarded live traffic packets/sessions, the smart proxy outputs multiple values of distinct types of computing environments and/or dependencies that can be determined based on the DPI and analysis of certain bytes of payload of the network traffic based on matching techniques as will be further described below with respect to various embodiments.

For example, multiple instances of different vulnerable services can be instantiated in a honeypot farm. Each service can be configured to provide one or more computing environments and dependencies. They can be based on standard service deployments based on container or VM technologies. As such, only minor or, in some cases, no customization or development is needed. In an example implementation, these instances of different vulnerable services are dynamically managed by an orchestration tool (e.g., a commercially available and/or open source orchestration tool, such as will be further described below).

In this example, matching techniques (e.g., various best matching techniques are further described below with respect to various embodiments) can be implemented to determine which vulnerable service provided more highest layer environments that satisfy the requirements of the incoming traffic (e.g., results of the DPI analysis of the live attacking traffic, which includes an identification of the computing environment and/or dependencies). In this example implementation, the smart proxy forwards the traffic to the service in near real-time. As such, the disclosed techniques can increase or maximize the chance of triggering a vulnerability exploit to be performed and detected in the disclosed honeypot farm (e.g., by providing the correct service environment that attacking live traffic is targeting, which can maximize the likelihood of triggering an exploit or compromise activity being performed and then detected by the attacking live traffic in the disclosed honeypot farm).

In one embodiment, instead of analyzing traffic/logs on a case-by-case basis, an intrusion detection component (e.g., IDS implementation) is implemented in each instance of a service in the disclosed honeypot farm to indicate attacks and exploits. In an example implementation, in each instance of a vulnerable service implemented/instantiated in the honeypot farm, a hybrid intrusion detection and anomaly detection mechanism is implemented to identify one or more compromises (e.g., to detect a vulnerability exploit and/or other malware/nefarious activity). Specifically, the hybrid intrusion detection and anomaly detection mechanism is implemented to inspect traffic by an Intrusion Detection System (IDS) to analyze all derived files based on file system event callback activities and to also analyze sensitive system calls and common post-exploitation activities, such as will be further described below.

In some embodiments, various security enhancements are also implemented in the honeypot farm, including network access control, network usage limitation, connection timeout, network isolation, and/or CPU/memory usage restrictions, such as will be further described below.

The disclosed honeypot farm embodiments (e.g., a high-interactive honeypot farm) can detect known malware activities/exploits as well as new types of malware attacks (e.g., new exploits/vulnerabilities associated with zero-day threats). The disclosed honeypot farm embodiments also defeat common bypass/evasion techniques (e.g., malware anti-VM techniques). The disclosed honeypot farm implementation also efficiently handles live traffic received from the honeypot sensors using the disclosed smart proxy techniques as will be further described below.

In an example implementation, deployment of the disclosed sensors is easier, safe, universal, and low-maintenance, in which the honeypot farm provides a high-interactive honeypot cloud environment that includes efficient and effective intrusion detection and exploit detection as further described below. Moreover, the disclosed honeypot farm is scalable (e.g., to handle more traffic and to support new vulnerabilities and exploits) to facilitate providing rich and comprehensive threat intelligence as will be further described below.

As further described herein, these techniques described herein can also facilitate competitive intelligence gathering of advanced threats or other sophisticated attacker attacks by using the smart proxy to facilitate detection of malware activities in the honeypot farm implemented in an instrumented VM environment.

Accordingly, techniques for a large scale high-interaction honeypot farm are disclosed, and techniques for a smart proxy for a large scale high-interaction honeypot farm are also disclosed. In some embodiments, the large scale high-interaction honeypot farm includes a virtual machine (VM) orchestration manager (e.g., an orchestration tool) that manages a plurality of instantiated services executed in an instrumented VM environment, in which the plurality of instantiated services executed in the instrumented VM environment correspond to the large scale high-interaction honeypot farm that emulates a plurality of distinct computing environments and dependencies as further described below with respect to various embodiments.

As used herein, a honeypot farm generally refers to a virtual emulation of a plurality of devices and/or services corresponding to a plurality of distinct computing environments and dependencies. In an example implementation, the honeypot farm can include a virtual clone of one or more types of devices to mirror and synchronize various attributes of each of such corresponding actual devices (e.g., such attributes can include IP address, OSs (including version and patch level), and application software (including versions and patch level), various configuration settings, and/or various other attributes). For example, a honeypot farm can be generated to emulate computing environments and dependencies common to a typical enterprise network or other computer network that can include a variety of devices, such as servers, appliances, desktop computers, mobile computers including laptops, tablets, smart phones, printers, networking devices including routers, and/or various other devices capable of wireless or wired-based network communications, which can provide various services in communication over the network.

Techniques described herein can be used to analyze malware (e.g., a malware sample) and/or associated attacker activities (e.g., APT activities) in a large scale high-interaction honeypot farm that can emulate, for example, a target computing environment and dependencies based on a DPI of network packets analyzed using a smart proxy, which can facilitate triggering the malware behavior. As a result, this makes it much more difficult for an attacker to detect that the malware is being executed in a virtual sandbox environment instead of on the actual target host in the target network environment.

In particular, techniques described herein can be used to provide improved competitive analysis of various advanced threat attacks (e.g., APT and/or other advanced threat attacks). For example, these techniques can provide insight into the advanced stages for advanced threat attacks that cannot be observed in the short period of time that would typically be allocated for a VM analysis using existing approaches. As such, these techniques can also provide critical threat research and reliable detection for advanced threat attack prevention. For example, collection and analysis of rootkits, end-game tools, and exfiltration techniques can be important to advanced threat research and timely alerting (e.g., advanced threats can then be monitored in real-time by a threat/security analyst).

Also, a new level of targeted threat intelligence can be delivered to customers of a security service that implements the disclosed honeypot farm related techniques. As an example, in addition to a report that delivers hashes, domains, IPs, and network activities (e.g., a network log/report, such as using packet capture (pcap) logging for capturing network traffic) within a single sandbox session, a broader view (e.g., trace) of a compromise at the network level can be included in the report.

Further, such threat intelligence can provide indicators that can be used by a data appliance implementing a firewall or other security device to provide for future prevention of such advance threat attacks. For example, extracting indicators and automatically identifying malware and exploitation can be performed to identify new malware IPs, new malware domains, new malware URLs, new malware network signatures, and/or other indicators that can be used to implement prevention at a firewall or other security device and/or at a host/endpoint device.

Accordingly, various techniques for providing for a large scale high-interactive honeypot farm and for providing a smart proxy for a large scale high-interactive honeypot farm are disclosed. For example, using such techniques can facilitate an enhanced detection of advanced threats using an instrumented virtual machine (VM) environment. As will be apparent to one skilled in the art in view of the various techniques and embodiments described herein, while the various honeypot farm related techniques described herein are described with respect to VM environments using a security service (e.g., a cloud security service), such techniques can similarly be applied to various other security environments, including, for example, performed in part or completely on premises and/or using security devices such as appliances, gateways, servers, and/or other security platforms capable of implementing various virtual environment techniques disclosed herein.

System Processing Architectures for a Large Scale High-Interactive Honeypot Farm FIG. 1 is a diagram of a system architecture for a large scale high-interactive honeypot farm in accordance with some embodiments. For example, such an environment can facilitate performing a dynamic analysis of malware (e.g., a malware sample that may be potential or known malware, in which malware generally refers to various forms of malicious software, links to malicious software, etc., which can be associated with network traffic (e.g., a network connection), such as embedded with a file, email, attachment to an email, web page, web download file, linked to a resource that includes the malicious software, and/or using various other delivery and distribution mechanisms). Specifically, the malware can be associated with various types of advanced threats, such as APTs or other advanced threats (e.g., malicious software can include any malicious computer code or executable program, such as active content, executable code, and scripts, that can interfere with operation of a computing device or computer network, attempt unauthorized access of data or components of a computing device, and/or perform various other malicious, unauthorized, and/or undesirable activities). More specifically, a variety of attempts by an unauthorized person (e.g., an attacker) 104 to attempt to deliver malware to a customer network (e.g., an enterprise network) 110, which can then be used to target devices on the customer network in order to, for example, propagate malware and/or to perform various other unauthorized/undesirable actions are described, as are techniques for performing a dynamic analysis for advanced threats.

Referring to FIG. 1, a system architecture for providing a large scale high-interactive honeypot farm includes sensors in customer network 110. In this example, the sensors include providing a network gateway firewall (NGFW) configured as a sensor as shown at 102, a router (e.g., a network router) configured as a sensor as shown at 106, and an endpoint (e.g., a server or other computing appliance/device) configured as a sensor as shown at 108. Each of these sensors is configured to forward a network connection (e.g., attack traffic as shown in FIG. 1) to a honeypot cloud 122.

Specifically, attack traffic is forwarded from the sensors within a tunnel (e.g., a GRE or IPSec tunnel as shown in FIG. 1) as shown to a honeypot gateway (e.g., including a smart proxy component) 124 (e.g., GRE, IPSec, or other tunneling protocols can be used for tunneling attack traffic from the Internet and/or an Intranet into a honeypot farm). In an example implementation, the honeypot gateway includes a smart proxy for intelligently routing the attack traffic to a service instantiated in a honeypot backend (e.g., a honeypot farm) 126.

Figure 2:
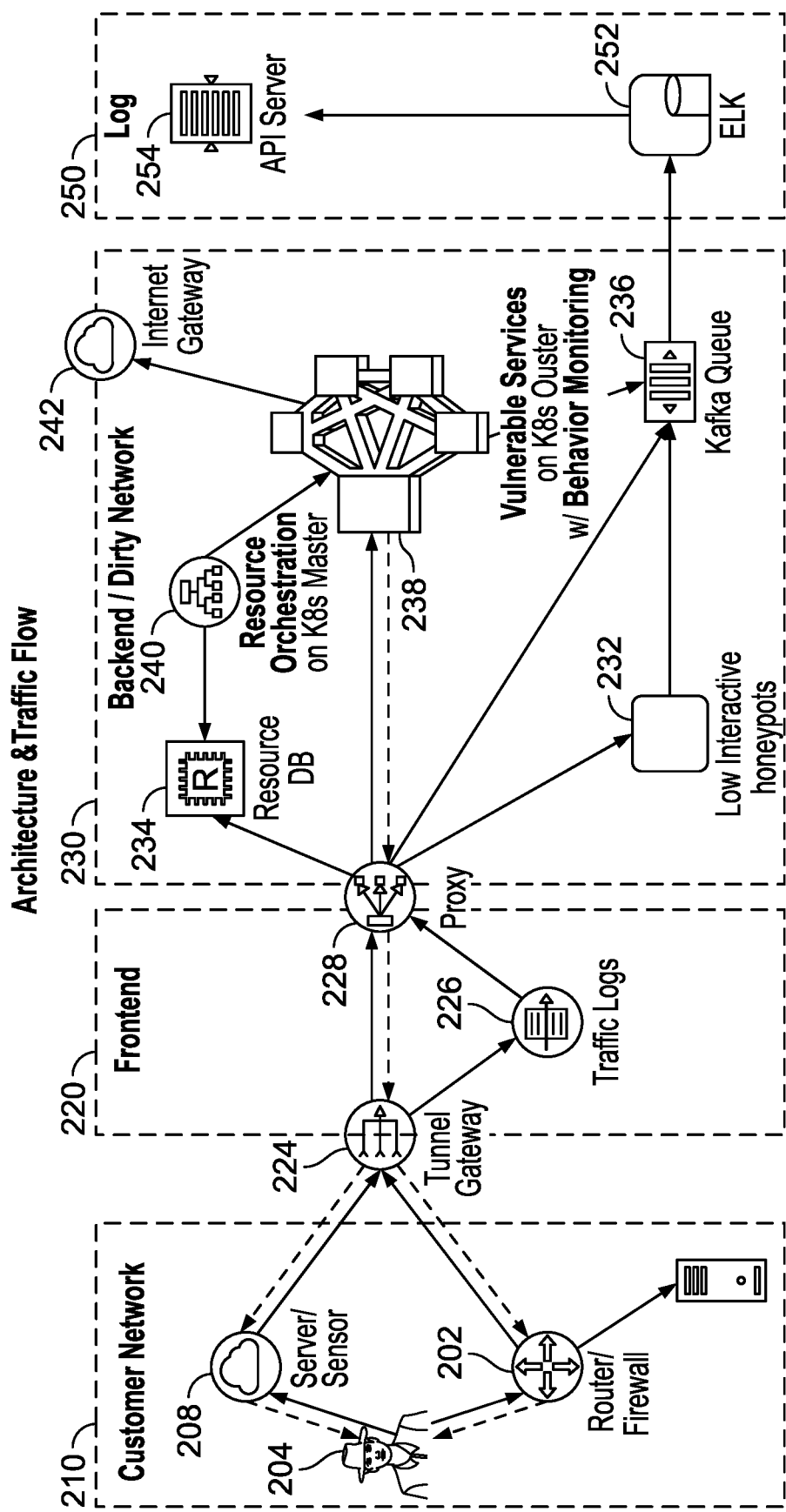
FIG. 2 is a diagram of an architecture and traffic flow for a smart proxy for a large scale high-interactive honeypot farm in accordance with some embodiments.

Honeypot backend 126 executes a plurality of instances of various vulnerable services and is generally referred to herein as the high-interactive large scale honeypot farm. The honeypot gateway 124 performs deep packet inspection (DPI) on the attack traffic and applies a matching policy to identify a match between attack traffic and vulnerable services to maximize the possibility of triggering an exploit in the honeypot farm. As shown, honeypot backend 126 is in communication with the Internet (e.g., via an Internet gateway, such as shown in FIG. 2) to facilitate monitoring malicious activities, such as attack traffic attempting to communicate with malware domains, such as a command and control (CNC/C2 server), such as C2 server 134 as shown in FIG. 1.

A threat analysis component 128 performs threat analysis to identify an exploit or compromise by monitoring behaviors and finding anomalies or post exploitation activities (e.g., to identify compromise/malicious/exploit activities by analyzing behaviors of anomalies or post exploitation techniques). The results of the threat analysis are provided to an intelligence, IOC, Report component 130 and can be accessed by/provided to customers via APIs 132 as shown and as further described below with respect to FIGS. 2 and 3.

NGFW 102 can take a variety of forms. For example, appliance 102 can be a dedicated device or set of devices. The components of appliance 102 can also be integrated into or executed as software (e.g., a virtual NGFW/security component) on a general purpose computer, a computer server, a gateway, and/or a network/routing device. As an example implementation, an architecture for such a data appliance is further described below with respect to FIGS. 6 and 7.

In an example implementation, honeypot cloud 122 is implemented on a cloud computing service (e.g., Amazon Web Services® (AWS) or another commercially available/open source computing service can be used). An example of a honeypot backend/virtual machine server(s) is a computing device that can execute virtualization software, such as commercially available server-class hardware (e.g., a multi-core processor such as a dual 6-core Intel® processor with Hyper-Threading, four or more Gigabytes of RAM such as a 128 GB RAM, a system disk such as a 120 GB SSD, and one or more Gigabit network interface adapters). For example, honeypot backend 126 can be implemented using a commercially available/open source container framework and tools for providing virtual services as further described below with respect to FIG. 2. Honeypot cloud service 122 can be delivered either as a public cloud or as a private cloud (e.g., deployed locally on an enterprise network using a locally deployed data appliance, server, or other computing device that executes the container framework for providing virtual services).

In some embodiments, honeypot backend 126 is configured to implement various techniques performing a threat analysis for advanced threats monitored in a container-based virtual services environment as described herein with respect to various embodiments (e.g., implemented by executing real vulnerable services in a containerized environment, implemented by honeypot cloud service 122, such as further described below). For example, honeypot backend 126 can provide an instrumented virtual services environment capable of performing the various techniques as described herein. This instrumented virtual services environment, which can include one or more virtual services as described further below, can be instrumented to include, for example, various network activity logging, user level hooks, IPS/IDS monitoring, and/or kernel level hooks in the virtualized execution environment to facilitate the monitoring of various network and/or program related activities and/or behaviors during execution of the attack traffic using the instrumented virtual services environment and to log such monitored activities and/or behaviors for analysis based on the various techniques described herein with respect to various embodiments.

System Processing Architectures and Traffic Flows for a Smart Proxy for a Large Scale High-Interactive Honeypot Farm FIG. 2 is a diagram of an architecture and traffic flow for a smart proxy for a large scale high-interactive honeypot farm in accordance with some embodiments. As shown, a customer network (e.g., an enterprise network) 210 includes a router (e.g., a physical/virtual network router)/firewall (e.g., a physical/virtual NGFW or another physical/virtual security appliance/device) configured as a sensor as shown at 202 and a server (e.g., a physical/virtual server executing a Linux operating system (OS) or another type of OS/platform) configured as a sensor as shown at 208. Each of these sensors is configured to forward a network connection from an attacker 204 (e.g., attack traffic, such as shown in FIG. 1) to a tunnel gateway 224 in a frontend of a honeypot cloud as shown at 220.

Referring to FIG. 2, attack traffic is forwarded from the sensors within a secure tunnel (e.g., a GRE or IPSec tunnel or another type of tunnel) to tunnel gateway 224. Tunnel gateway 224 then forwards the connection/network traffic (e.g., attack traffic) to a traffic logging component shown as traffic logs 226 (e.g., the traffic logs component captures and stores traffic log information for past connections for later contextual use by the smart proxy as further described below) and also forwards the connection/network traffic to a proxy (e.g., a smart proxy) 228. Proxy 228 performs deep packet inspection (DPI) on the connection/network traffic (e.g., attack traffic), which can then be stored (e.g., in traffic logs 226) and also used as contextual information for the connection/network traffic (e.g., attack traffic) used by proxy 228 as described herein with respect to various embodiments. Proxy 228 applies a matching policy (e.g., performing best matching techniques based on contextual information associated with the attack traffic and/or past similar connections as further described below) to identify a match between attack traffic and vulnerable services to maximize the possibility of triggering malware associated activities (e.g., an exploit/attempted exploit) in the honeypot farm (e.g., in the monitored/instrumented vulnerable service(s)).

In this example implementation, the frontend of the honeypot cloud as shown at 220 includes proxy 228 for intelligently routing the attack traffic to a matching service instantiated in a honeypot backend/dirty network (e.g., a honeypot farm) 230 as will be further described below. Generally, in attacking traffic, exploits can vary and are generally identified case by case (e.g., manually writing an IDS/IPS signature by a security analyst). Other parts of attacking traffic often have some common characteristics and indicate, for example, what service/device/server/environment is being targeted and what attackers want to do after compromising that target. Accordingly, the disclosed techniques for providing a smart proxy for a large scale high-interactive honeypot include automatically matching a vulnerable server/service that is being targeted by the attack traffic based on deep packet inspection (DPI) of the attack traffic and associated contextual information, such as will be further described below.

Backend/dirty network (e.g., a honeypot farm) 230 executes a plurality of instances of various vulnerable services (e.g., which can be implemented using a Kubernetes K8S cluster, which is an open source orchestration framework for containerized applications, or another commercially available/open source orchestration framework for containerized applications can similarly be used) 238. As shown, vulnerable services 238 are in communication with an Internet gateway 242 (e.g., to facilitate monitoring malicious activities, such as attack traffic attempting to communicate with malware domains, such as a command and control (CNC/C2) server, such as C2 server 134 as shown in FIG. 1).

In this example implementation, vulnerable services 238 are configured and instantiated with behavior monitoring, which includes hybrid intrusion detection as further described below and is generally referred to herein as the high-interactive large scale honeypot farm. As also shown, backend/dirty network (e.g., a honeypot farm) 230 includes a resource orchestration/orchestrator component/tool (e.g., a K8s Master is an orchestration tool for the Kubernetes K8s cluster or another orchestration tool for another type of commercially available/open source orchestration framework for containerized applications can similarly be used) 240. Backend/dirty network (e.g., a honeypot farm) 230 also includes a resource data store (e.g., a database that stores the available instantiated virtual services) 234 that is in communication with proxy 228 and resource orchestrator 240.

Specifically, the frontend of the honeypot cloud as shown at 220 includes proxy 228 for intelligently routing the attack traffic to a matching service instantiated in a honeypot backend/dirty network (e.g., a honeypot farm) 230 and can be directed to a high-interactive vulnerable service instantiated in vulnerable services 238 or a low interactive honeypot 232 as will be further described below. Proxy 228, vulnerable services 238, and low interactive honeypots 232 are each in communication with a Kafka queue 236 that is in communication with an ELK component 252 (e.g., the open source Kafka component is used as a buffer and an open source ELK Stack component is used to collect and analyze the Kafka logs, or another open source/commercially available logging infrastructure can be used for handling the logging data collected using vulnerable services with behavior monitoring 238 and low interactive honeypots 232) of a log infrastructure 250. Log infrastructure 250 also includes an API server 254 to facilitate access to the collected logging data for security/threat analysis (e.g., to associate threat intelligence horizontally and vertically and generate actionable threat intelligence) as further described below.

In an example implementation, the sensor is implemented as a light-weight clientless traffic forwarder component that can be executed on various devices (e.g., routers, firewalls/security devices, and servers, such as similarly described above). In this example, the sensor maintains an IPSec or GRE tunnel (e.g., the IPSec/GRE tunnel can be built based on a customer configuration) with the tunnel gateway. The sensor forwards certain incoming IPv4 TCP traffic (e.g., the sensor does not ingest real traffic, the sensor just forwards the traffic) to the tunnel gateway (e.g., via NAT or routing, and route optional configuration settings can be used to limit traffic speed). The sensor also forwards honeypot responses back to the attacker, such as shown in FIG. 2. For example, the sensor can be deployed via configuring a server or desktop (e.g., a Linux OS server/desktop or another OS/platform configured server/device), a virtual or physical firewall/security device (e.g., a commercially available Palo Alto Networks PAN-OS firewall or another commercially available/open source firewall/security device), or a virtual or physical router. As similarly described above, the sensor can be deployed at any location including on the Internet, in an enterprise data center, an enterprise/office network, a service provider network, a home/residential network, perimeter network/demilitarized zone (DMZ), managed security service provider (MSSP) customer network, and/or other network computing locations/environments. In some configurations, the sensor can be configured to automatically drop all new connections from the tunnel gateway to the sensor (e.g., to enhance safety/security).

In an example implementation, the tunnel gateway is configured to limit traffic (e.g., speed, number of connections, and/or other parameters) from the sensor (e.g., the tunnel gateway can be configured to drop multicast or broadcast traffic and/or to drop traffic to not-configured destinations). In this example, the tunnel gateway forwards the live attack traffic from the sensor to the smart proxy (e.g., using Source Network Address Translation (SNAT) and Destination Network Address Translation (DNAT)). The tunnel gateway sends the SNAT and DNAT record information to a NAT Redis server. The tunnel gateway also forwards response(s) from the smart proxy to the original sensor associated with that live attack traffic.

In an example implementation, the high-interactive honeypot farm executes real vulnerable services in a containerized environment. For example, the high-interactive honeypot farm can execute real vulnerable services, such as one or more of the following services: WebLogic, phpMyAdmin, Drupal, CouchDB, Redis, MongoDB, Hadoop, Memcached, SSH, Telnet, Struts2, VNC, GoAhead, ElasticSearch, Samba, and/or other potentially vulnerable services. As another example, the high-interactive honeypot farm can execute simulated fingerprints and vulnerabilities in one or more devices, such as IoT devices (e.g., home/residential routers, cameras, smart TVs, DVRs, and/or other (IoT) devices).

In some embodiments, the smart proxy uses contextual information and DPI techniques to profile the attack traffic for facilitating forwarding decisions. For example, the attack traffic can be forwarded to one of the services or devices by a stateful smart proxy based on strategies including, for example: by destination port, by payload DPI results, by source IP reputation and attacking history, by payload history and similarity, and/or by randomization.

In an example implementation, before proxying the traffic, deep packet inspection is performed using the smart proxy, for example, to the first 1024 bytes or some other set(s) of bytes from the live attack traffic. The smart proxy then profiles the traffic based on the deep packet inspection (e.g., attack traffic may have multiple DPI results). Example results can include one or more of the following: layer 7 protocol (e.g., HTTP, FTP, MQTT, SMB, Telnet, and/or SSH); specific server (e.g., Apache, GoAhead, CouchDB, Redis, and/or Proftpd); app framework, runtime, middleware (e.g., tomcat, Struts2, Spring, PUP, and/or log4j); app (e.g., Drupal, phpMyAdmin, Jenkins, and/or WordPress); specific device (e.g., PAN-OS, Netgear router, and/or Synology NAS); specific vulnerable server (e.g., ShellShock, Drupalgeddon, and/or CVE-2017-17562). As will be further described below, a best matching strategy is implemented by the smart proxy to find an optimal match based on the profiled attack traffic for which vulnerable services/devices provide the highest layer environments that satisfy the requirements (e.g., DPI results) of the live attack traffic.

In some embodiments, the smart proxy performs various functions. For each incoming connection, the smart proxy determines what kind of resources to be forwarded to build and maintain the proxying sessions. In an example implementation, the smart proxy supports both TCP and UDP protocols. In this example, the smart proxy performs forwarding decisions based on one or more of the following:

user configuration and preferences, first packet's (e.g., or first group of packets') content, and/or based on an attacker's past intention and reputation (e.g., from a previous connection's runtime analyzer and post analyzer results, from previous connection's traffic reply results).

Figure 3A:
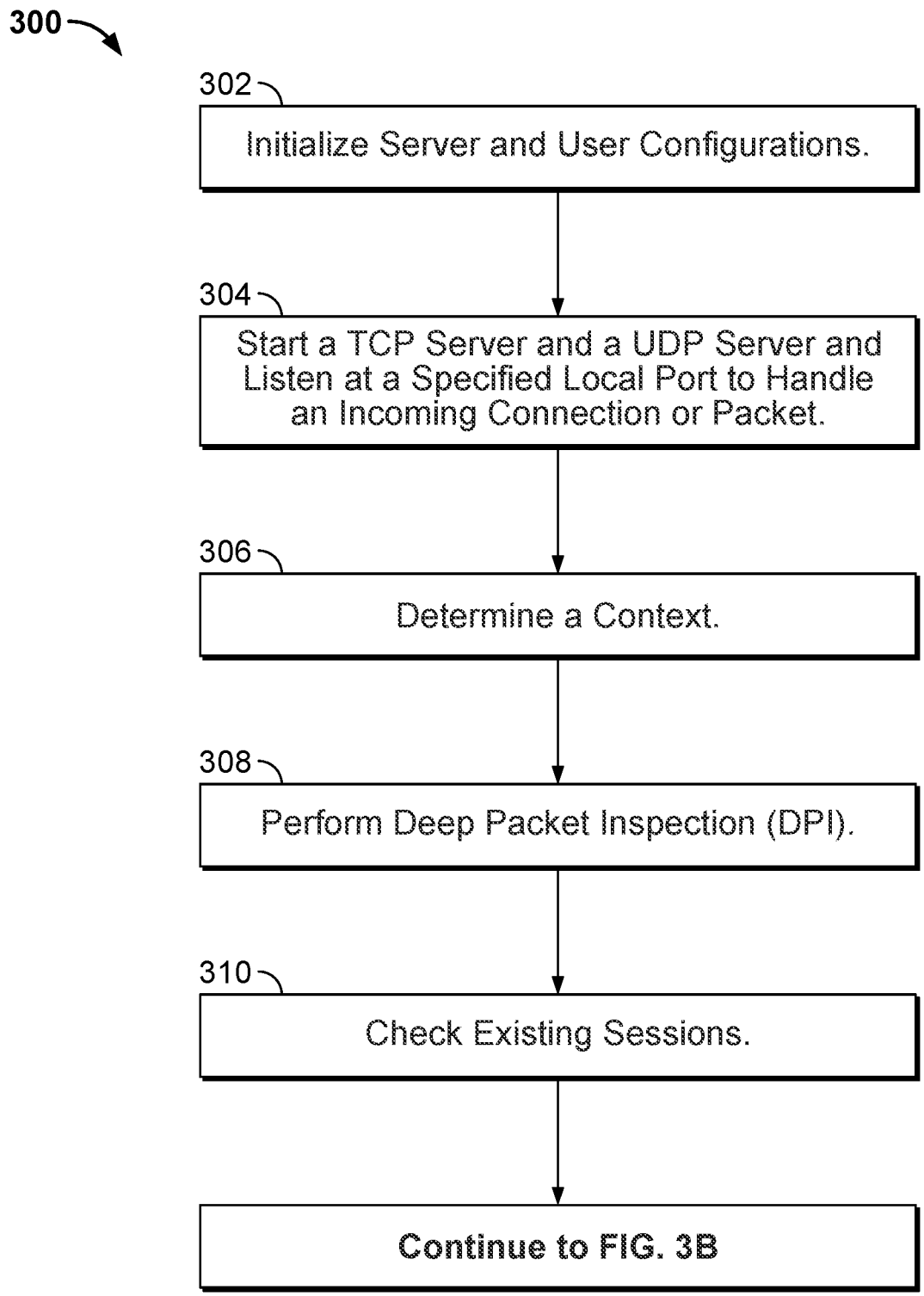
FIGS. 3A and 3B provide a flow diagram illustrating a process for executing a smart proxy for forwarding live attack traffic from sensors for providing a large scale high-interactive honeypot farm in accordance with some embodiments.
Figure 3B:
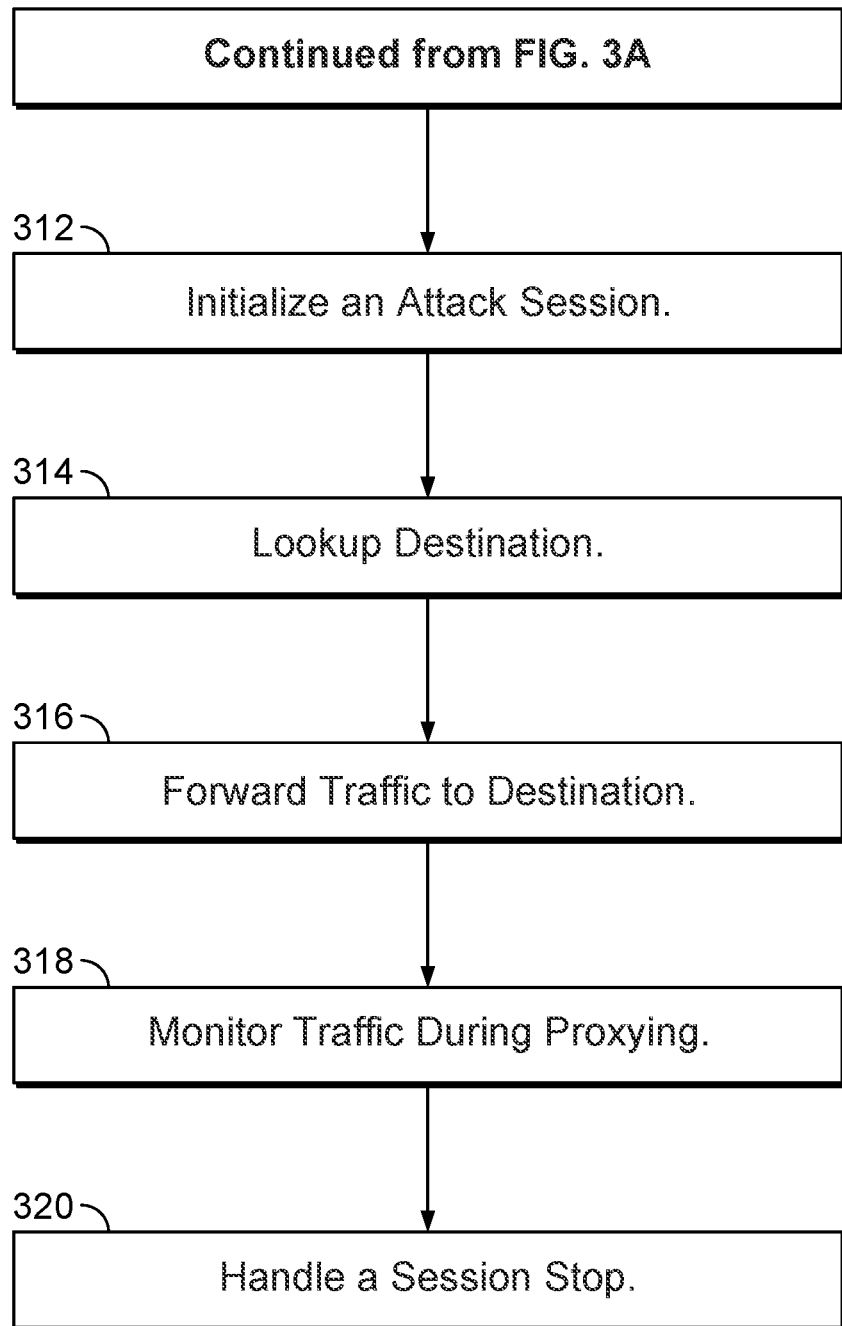

FIGS. 3A and 3B provide a flow diagram illustrating a process for executing a smart proxy for forwarding live attack traffic from sensors for providing a large scale high-interactive honeypot farm in accordance with some embodiments. In one embodiment, a process 300 is performed by system architectures and components as similarly described above with respect to FIGS. 1 and 2.

Referring to FIG. 3A, the process begins at 302 when the smart proxy is initialized with server and user configurations. At 304, the smart proxy starts a TCP server and a UDP server and listens at a specified port to handle an incoming connection or packet (e.g., the smart proxy can be configured to accept TCP connections or UDP packets from known (tunnel) gateways). At 306, the smart proxy determines a context (e.g., performs context construction by querying the original src/dst IP:port before tunnel gateway's NAT, by querying from NAT Redis server, and by querying the user from user configurations). At 308, the smart proxy performs deep packet inspection (DPI) (e.g., on an initial payload of certain bytes, such as described herein to include in a context for the live attack traffic, which can include, for example, customer information, src/dst IP:port, DPI results, and/or other parameters/information). For example, the smart proxy can also perform various traffic filtering during this stage of operations (e.g., drop packet(s) not from known gateways or no NAT record found, drop broadcast or multicast traffic, drop traffic if looking for public proxy server, and/or drop traffic that is in excess of a user/server configured value). At 310, existing sessions are checked. For example, the smart proxy can check whether the connection/packet could be classified to an existing attacking session (e.g., from the same customer and the same source IP, to the same IP and the same port (or ports in a group), within 3 minutes or another configured period of time). If so, the smart proxy can directly reuse the session's forwarding result. The smart proxy can also query the attacking session's statistics, and if the attacking session's statistics exceed a configured value, then the smart proxy can stop the session. In some cases, the smart proxy can also skip this check existing sessions operation and treat the traffic as a new connection/packet (e.g., and as similarly described below, for a new connection packet, the smart proxy can query the attacking session's forwarding destination, proxy the TCP connection or send the UDP packet(s), update the session's statistics, and log the TCP connection). The flow of operations proceeds to FIG. 3B.

Referring to FIG. 3B, at this stage of operations, the traffic is being handled as a new connection/packet. At 312, a new attacking session is initialized (e.g., starting a timeout time, and initializing statistics). At 314, a destination lookup is performed. For example, a destination lookup can include the following operations to perform a best matching strategy: (1) query user preferences (e.g., based on a customer configuration, such as a port-app map, proto-app map, specific configured containers, etc.); (2) query source IP recent reputation and knowledge of associated behaviors; (3) query observed scanning patterns; (4) query recent similar requests; (5) create a destination profile by the following: user preferences, reputation, DPI results, low interaction honeypots; (6) query resources' availability (e.g., from a Redis server); (7) vote for an app; (8) select the destination based on the best matching analysis results; and (9) update the occupation of this destination (e.g., from the Redis server).

At 316, the traffic is forwarded (e.g., proxied) to the destination based on the destination lookup operation(s) (e.g., session statistics can be updated and logging can be performed for the TCP connection or UDP packet). At 318, the traffic is monitored during proxying. For example, for each packet, the session statistics are updated. If the session exceeds an allowed usage configured value (e.g., based on various example configuration parameters for allowed usage as similarly described above and further described below), then the session can be stopped. At 320, the smart proxy handles a session stop. For example, the smart proxy closes all TCP connections in the session and updates that destination as the session is dead/terminated.

Figure 4:
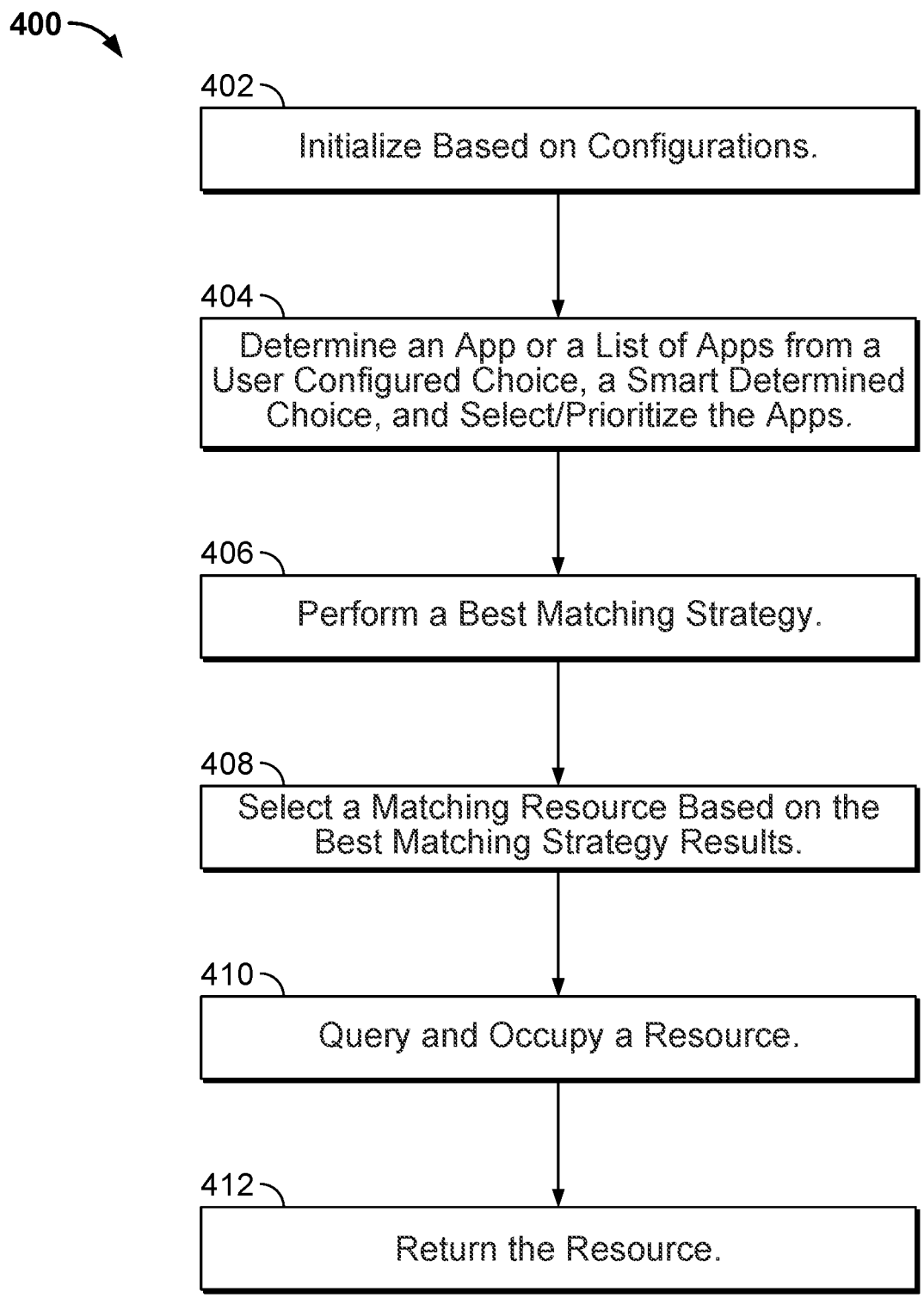
FIG. 4 provides a flow diagram illustrating a process for a smart proxy to identify a backend server in a large scale high-interactive honeypot farm in accordance with some embodiments.

FIG. 4 provides a flow diagram illustrating a process for a smart proxy to identify a backend server in a large scale high-interactive honeypot farm in accordance with some embodiments. In one embodiment, process 400 is performed by system architectures and components as similarly described above with respect to FIGS. 1 and 2.

Referring to FIG. 4, the process begins at 402 when the smart proxy is initialized based on configurations. For example, the initialization operations can include initializing one or more of the following: app definitions and dependencies, image configurations, low-interactive honeypot configurations (e.g., for (IoT) devices), and a Redis server connection. At 404, the smart proxy determines an app or a list of apps from a user choice (e.g., if a user specified a preferred destination, then the smart proxy uses that destination directly; if the user specified a preferred app, then the smart proxy uses that preference to next stage/operation), a smart determined choice (e.g., DPI results returned a list of apps based on a profile match; recent attack reputation returned a list of apps; and/or other smart matching operations can be performed, such as similarly described above and further described below), and select/prioritize apps. At 406, a best matching strategy is performed.

At 408, selecting a matching resource based on the best matching strategy results is performed. For example, the smart proxy can implement a maximum fit principal, topmost the first principal, and utilize a high interactive and low interactive probability for the profiled live attack traffic. In an example implementation, the smart proxy checks the returned DPI result, which includes the matched list in the following order: vulnerability environments, apps, devices, frameworks, servers, and services. The smart proxy selects one in the topmost level randomly, which means that the first matched element in the matched list is used to find the available image resource. If there is no available resource, then the smart proxy continues to choose the second matched element, and so on. If there are two or more matched resources, then the smart proxy just randomly picks up one of them. If there are no matched resources by using the DPI results, then the smart proxy will forward the traffic to the low-interactive honeypot according to the destination port number.

In an example case, a set of attack traffic packets can be analyzed by DPI and the matched list can be returned as follows: ["vulnerability environments": "CVE-2017-10271", "apps": "WebLogic", "devices": " ", "frameworks": " ", "servers": " ", "services": "TR-069"]. In this example, the smart proxy will use the vulnerability environment "CVE-2017-10271" to find the current available resource to support this vulnerability environment. If there is one available, then the traffic will be directly forwarded to that resource. If there is no available resource, then the smart proxy will continue to find the available resource to support the app "WebLogic". By this priority choice, the smart proxy can attempt to deliver the traffic to the best matched resource to trigger the vulnerability and the attack payload, such as will be further described below with respect to various embodiments and example use case scenarios.

At 410, the smart proxy queries and occupies a resource. At stage 412, the smart proxy returns the resource. In an example implementation, the smart proxy is configured to query an RES Redis server to select a free instance of the preferred backend resource. The smart proxy builds proxying between the attacking traffic and the selected backend instance and then notifies the RES Redis server that the instance is being occupied. As similarly described above, the events can be logged (e.g., using a Kafka queue 236 as shown in FIG. 2). The smart proxy can also be configured to stop the attack session by timeout or by a configured traffic usage quota as similarly described above. Smart proxy APIs can also be provided to facilitate a programmatic notification facility with the security monitoring infrastructure in the honeypot farm to, for example: (1) notify the smart proxy that a session should be shut down; (2) notify the smart proxy that a session is looking for certain targets (e.g., from low-interaction honeypots or real-time analyzers, etc.); and/ or (3) notify the smart proxy that a session began to listen to a local port (e.g., from a real-time analyzer executed in the honeypot farm instance/environment). In this example, all network traffic associated with the instance can also be tapped and sent/forwarded to a firewall/security device (e.g., NGFW 102 or another firewall/security device) for vulnerability detection and a coverage test.

Figure 5:
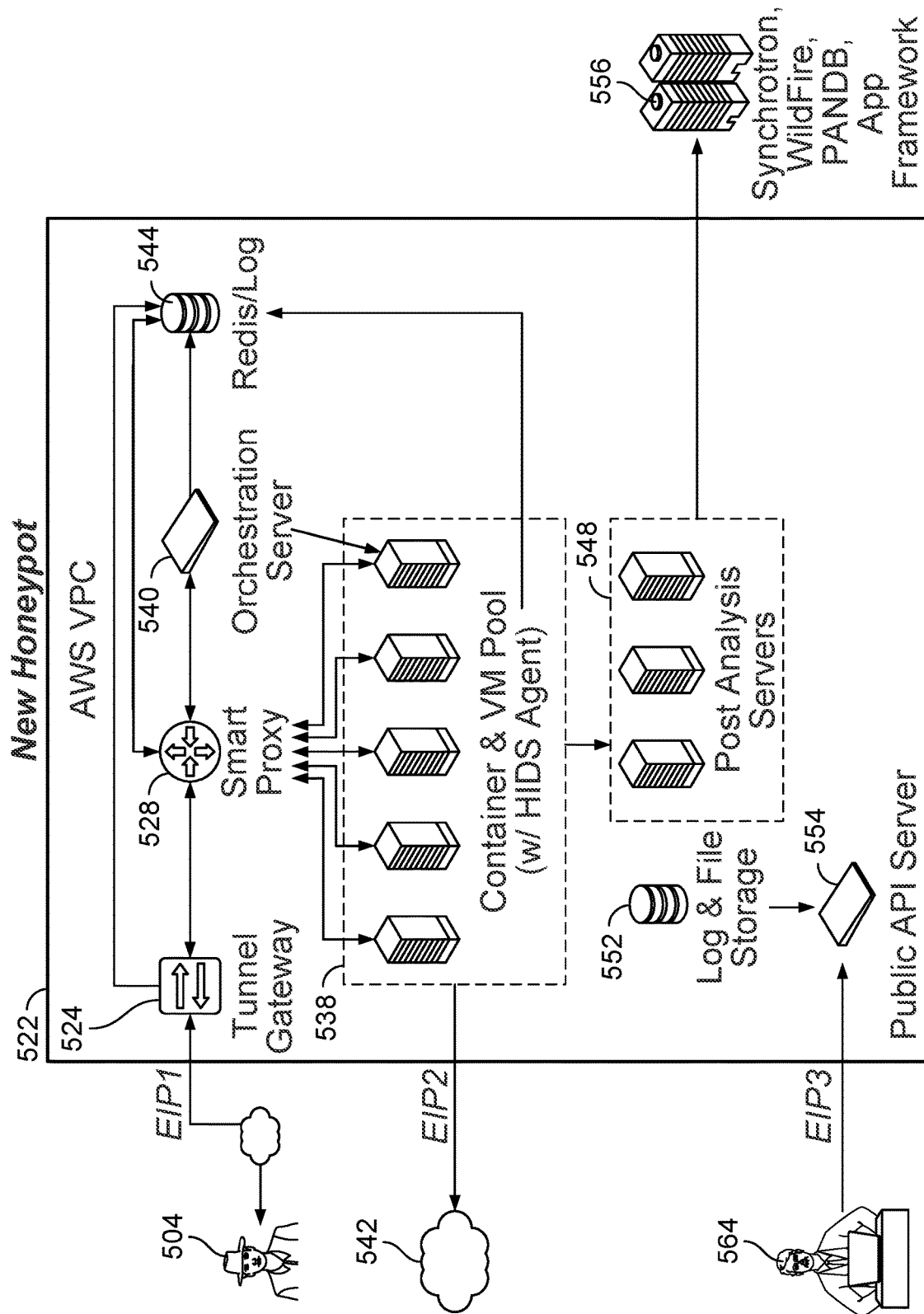
FIG. 5 is a diagram of an architecture and traffic flow for instantiating a new honeypot instance for serving an attack in a large scale high-interactive honeypot farm in accordance with some embodiments.

FIG. 5 is a diagram of an architecture and traffic flow for instantiating a new honeypot instance for serving an attack in a large scale high-interactive honeypot farm in accordance with some embodiments. As shown, a honeypot cloud 522 can be implemented using the Amazon's AWS Virtual Private Cloud (VPC) computing service. Honeypot cloud 522 includes a tunnel gateway 524 in a frontend of the honeypot cloud as shown.

Referring to FIG. 5, attack traffic is forwarded from an attacker 504 (e.g., via the sensors as shown and similarly described above with respect to FIGS. 1 and 2) within a secure tunnel (e.g., a GRE or IPSec tunnel or another type of tunnel) to tunnel gateway 524. Tunnel gateway 524 then forwards the connection/network traffic (e.g., attack traffic) to a smart proxy 528. As similarly described above, smart proxy 528 performs DPI on the connection/network traffic (e.g., attack traffic), which is then stored in Redis/Log 544 and also provided as contextual information for the connection/network traffic (e.g., attack traffic) used by smart proxy 528 as described herein. Smart proxy 528 applies a matching policy (e.g., performing best matching techniques based on contextual information associated with the attack traffic and/or past similar connections as further described below) to identify a match between attack traffic and vulnerable services to maximize the possibility of triggering malware associated activities (e.g., an exploit/attempted exploit) in the honeypot farm (e.g., in the monitored/instrumented vulnerable service(s)).

In this example implementation, the honeypot cloud as shown at 522 includes an orchestration server 540 (e.g., executing a resource orchestration module) that is in communication with a container and Virtual Machine (VM) pool (e.g., with integrated Host IDS (HIDS) agents) as shown at 538. The container and VM pool can be executed on server class hardware as similarly described above. The honeypot instances can be in communication with the Internet as shown at 542 (e.g., to facilitate monitoring malicious activities, such as attack traffic attempting to communicate with malware domains, such as a command and control (CNC/ C2) server, such as C2 server 134 as shown in FIG. 1). In this example, for each vulnerable service, the resource orchestration module keeps multiple instances of it executing. Each attack exclusively occupies an instance or vulnerable service executed in the honeypot farm (e.g., an attack can include multiple sessions or packets to the same target in a certain/predefined/configurable time window; and so that its activities will not be affected and anomaly detection can be effective). After the attack is finished/timed out/killed, the instance can then be recycled for post analysis using post analysis servers 548 and log and file storage 552, which is accessible to a network/security admin 564 via public API server 554 as described herein with respect to various embodiments. As also shown in FIG. 5, post analysis results and log data can be provided to other security services/ frameworks (e.g., Synchrotron, which is a Palo Alto Networks system to perform data analysis and data correlation to generate actionable threat intelligence; Palo Alto Networks' Wildfire® service; Palo Alto Networks' PANDB; App Framework, which is a Palo Alto Networks product to provide the logging service and security applications; and/or other publicly/commercially available security services/ frameworks can be similarly used for performing such post analysis on the results and log data).

In this example implementation, orchestration server 540 (e.g., executing a resource orchestration module) manages container images as shown at 538 via a private container registry (e.g., the container images can be instantiated as vulnerable services/devices). The orchestration server also manages a cluster of machines to execute the containers as also shown at 538 (e.g., containers can be implemented using Docker® containers, Kata containers, LXC containers, or other commercially available/open source containers can be similarly implemented; and the VMs can be implemented using QEMU VMs, such as for emulating IoT devices, or other commercially available/open source VMs can be similarly implemented). Specifically, the orchestration server dynamically maintains the containers (e.g., and maintains a diversity of the different types of container images that can be instantiated as different types of vulnerable services/devices) and manages the lifecycle of each of these vulnerable container instances (e.g., the orchestration server can create, stop, commit, and/or delete a container; enforce resource limitations associated with the containers and VM pool, such as CPU usage, memory usage, disk input/output (I/O) frequency, and/or disk usage; and also provides APIs for managing the containers, such as the following APIs: query_connection_info(vuln_profile) and disconnect(conn_info)). For each of the alive containers, the orchestration server provides the access point (e.g., IP address and port number) to smart proxy 528 using a channel (e.g., using Redis/Log 544 to maintain a dynamic database of container status). The orchestration server provides a live view of which containers are free and which containers are connected. When a container is connected, the orchestration server removes it from the free containers pool. When a container is released, the orchestration server adds it back to the free containers pool. The orchestration server can be configured to maintain a certain number (e.g., a configurable number) of free instances for each container available. The orchestration server also manages the lifecycle of each of the low-interactive honeypot instances in the container and VM pool. The orchestration server can also communicate with one or more databases (e.g., including resource databases that can store container image configurations (e.g., port, vulnerabilities, etc.) and customer configurations, such as similarly discussed above with respect to resource database (DB) 234 as shown in and described above with respect to FIG. 2). As such, the orchestration server facilitates an auto-scalable and load balanced container and VM pool for providing the disclosed techniques for a large scale high-interactive honeypot farm using a smart proxy.

In this example implementation, container and VM pool with HIDS agents as shown at 538 provides intrusion detection and exploit identification for monitored activities for each of the container instances/VMs executed in the honeypot farm. For example, the HID S agents can be included in each container instance to provide network and host-based intrusion detection and anomaly detection. Specifically, the disclosed techniques include providing hybrid intrusion detection and anomaly detection (e.g., network-based and host-based intrusion detection using agents/modules implemented in a Go programming language or another programming language can be used, in which runtime intrusion detection is performed on the host machine/container using a runtime detection module/agent, and combined NIDS and HIDS techniques are performed on the machine/container environment, in which everything in the container is generally visible from the host (with sufficient privileges)). For incoming and outgoing traffic: the HIDS agents can identify exploits and C2 via PAN-OS and open source IDS, and identify and extract shellcode via an ExploitID module (e.g., ExploitID is a Palo Alto Networks tool to inspect the traffic dump file to identify known exploits and extract the shellcodes from exploits, and/or other publicly/commercially available security services/tools can be similarly used for performing such inspections of the traffic dump file to identify known exploits and extract the shellcodes from exploits). For file system events: the HIDS agents can obtain a local WildFire instant verdict (e.g., for Linux OS), a remote WildFire deep analysis, including a behavior analysis (e.g., persistence, modify system configuration related behaviors, backdoor associated behaviors, etc.). For system calls invoked by the service (e.g., in kernel level): the HIDS agents can detect common post-exploitation activities, and identify anomaly behaviors (e.g., based on baselines). The hybrid IDS techniques can also be used in the honeypot farm container-based and VM-based environment to restrict traffic usage and direction, such as to limit network speed and/or to limit intranet lateral movement, and/or other restrictions can also be configured and performed.

In this example implementation, network-based runtime intrusion detection can include generating a pcap dump; performing network traffic monitoring (e.g., using a Suricata engine (or another commercially available or open source engine/module can be similarly implemented) and the Redis server, which can include a layer 7 (L7) decoder to identify what types of resources to visit (to facilitate determining apps for matching as similarly described above)) using exploit signatures and information signatures; and also monitoring outgoing network traffic (e.g., using a tc and tcpdump), which can be used, for example, to prevent unsafe/aggressive network behaviors.

In this example implementation, host-based runtime intrusion detection can include performing file system monitoring (e.g., implemented using Inotify or another commercially available/open source file system monitoring module can be similarly implemented, which can, for example, facilitate analyzing properties, formats, locations; detect executable drops, detect configuration modifications, and privacy intrusions, which can be performed by applying YARA rules for such security related file system monitoring). In addition, host-based runtime intrusion detection can include performing behavior monitoring (e.g., implemented using Falco, an open source behavior monitoring module available from Sysdig, or another commercially available/open source behavior monitoring module can be similarly implemented, which can, for example, dump all syscalls, parameters, and associated resources).

In this example implementation, post analysis servers (e.g., executing post analysis modules) 548 can perform exploit detection and shell code extracting operations (e.g., using an ExploitID module as similarly described above). As also similarly described above, the Falco behavior detection module can detect abnormal behaviors (e.g., based on pre-defined "normal" patterns). Sample analysis (e.g., samples can be stored in log and file storage 552, in which files can be detected using the hybrid IDS agents/modules) can also be performed using Wildfire as similarly described above. In addition, log analysis can be performed on logs stored in log and file storage 552 (e.g., log analysis can be performed to identify malicious behaviors from logs). In an example implementation of the log analysis, all system call logs, file operation logs, and network activity logs are analyzed to perform the pattern match for detecting malicious behaviors (e.g., the system call "read" is executed to read a path "/etc/shadow," which is identified by the log analysis as the reading of the sensitive file behavior). Such results including, for example, logs (e.g., including logs from the smart proxy and logs from the hybrid IDS monitoring/detection, which can be associated together in the log and file storage as being derived from monitoring the same or associated attack traffic/session(s)), files, pcaps, and/or other information can be sent to the Synchrotron, Wildfire (e.g., sample/files can be sent to Wildfire for further analysis), PanDB, and the App Framework as shown at 556 in FIG. 5. As an example, the logs can be correlated based on a container identification (ID) and IP:port values.

In this example implementation, log and file storage 552 can implement the logging infrastructure. For example, the logging infrastructure can be implemented using a Kafka queue, LogStash, ElasticSearch, and a file server (e.g., for collecting files derived from each of the containers, storing them in AWS S3, and output logs) as similarly described above with respect to FIG. 2.

In this example implementation, various threat intelligence generated using the large scale high-interactive honeypot farm and post analysis servers (e.g., post analysis modules) 548 can be shared, for example, using public API server 554 as shown in FIG. 5. For example, various threat intelligence generated using the large scale high-interactive honeypot farm can include raw logs, original sample files, pcap files via customer APIs, and/or various other information (e.g., including various other information/data/content generated/extracted using post analysis servers 548 and stored using log and file storage 552). Specifically, in this example, the threat intelligence data can be analyzed and associated for sharing via customer APIs, a graphical user interface (GUI) (e.g., Kibana based GUI, and/or a search tool (e.g., ElasticSearch)). For example, an analysis report for each individual attack to describe its full cyberattack lifecycle can be provided via customer APIs and/or via a web-based GUI. As another example, IP related intelligence can be provided via customer query APIs.

In one embodiment, during/after the completion of analysis of a malicious event or malware sample by the honeypot farm, all monitored behavior/activities data collected from the honeypot farm environment are processed to deliver any/all of the following: (1) an alert to the operator indicating that malicious activity has occurred that requires the attention of the security response team; (2) a technical forensics report of the incident describing in detail all events observed on the service/device instances and the honeypot farm, including, for example, all host-based and network-based artifacts that might be present in a stand-alone sandbox forensics report (e.g., WildFire® from Palo Alto Networks or other security service related products), such as modified files, Windows registry changes, network requests, behavioral summary, etc., for each host that was "touched" during the analysis timeframe by the attacker, presented as a timeline of events; and (3) host-based and network-based protections (e.g., host-based or network-based signatures) or indicators of compromise that can be used by the operator to detect the same or similar attack/attacker on the real production network.

While the disclosed large scale high-interactive honeypot farm is engineered to intentionally help attacks and exploits succeed, the security risks have been mitigated by multiple layers of security mechanisms. These multiple layers of security mechanisms include network access control (e.g., attacking traffic can only follow the direction specified, so that a customer network and the large scale high-interactive honeypot farm infrastructure is not affected/at risk); network usage/connection limitation and timeout values can be configured (e.g., to prevent incoming or outgoing flooding or a denial of service (DoS) attack); network isolations (e.g., to prevent cross-infection between services or spreading to another customer/enterprise network); dedicated and isolated channel (e.g., for outgoing C2 traffic); CPU/memory usage restrictions can be configured (e.g., to prevent abusing for coin mining, etc.); and Kata, a VM-based container runtime, can be used so that the host kernel is not exposed to the attacker.

In this example implementation, the disclosed system can be deployed on AWS as similarly described above. For example, a Linux machine can be deployed as a honeypot sensor with a GRE tunnel (e.g., using an Amazon t3.small EC2 instance or other virtual or physical Linux machines can be similarly used as would now be apparent to one of ordinary skill in the art). Example Linux host specifications include the following: Operating System: Ubuntu Server 16.04 LTS; Memory: 2 GB; CPU: 2×Intel® Xeon® Platinum 8175M CPU @ 2.50 GHz; and Ethernet Interface: 1.

In this example implementation, the disclosed system utilizes various DPI rules/content and various IDS rules/content as similarly described above. Various DPI rules are provided for profiling/identifying various services, servers, frameworks, apps, devices; various vulnerable environments (e.g., Drupal, Struts2, CouchDB, GoAhead, phpMyAdmin, WebLogic; SSH, Telnet; Honeytrap, Glastopf, Dionaea; various popular common vulnerabilities and exposures (CVEs)). Suricata's default Emerging Threats IDS ruleset can be implemented in the hybrid IDS agent as similarly described above.

Example tactics and techniques implemented by the disclosed system for monitoring/detecting malicious activities in the honeypot environment include one or more of the following: Initial Access; Port Probing; Port Traversal; Service Probing; Device Probing; Execution; Brute Force with Weak Password; Auth Bypass; File Writing; Code Execution via Shell; Code Execution via Exploit; Malware Downloading; Database Data Read, Write, Delete; Persistence; Webshell; Reverse Shell; Binding Shell; Backdoor Account; Backdoor SSH Credential; Backdoor Service; System binary replacement; Cron job; Daemon or Startup Items; Bash Configuration; Privilege Escalation; Local Privilege Escalation Exploit; Sudo; Modify Sudoer Configuration; Setuid; Defense Evasion; Packer; Evade Security Tools (e.g., Antivirus, Network Monitoring, Endpoint Protection, Cloud Protection); Clear History; Self Deleting; Hidden File; Hidden or Masquerading Process Name; Rootkit; Sandbox Evasion; Anti-VM; Anti-Debugging; Credential Access; Bash History; User Credential; User Private Keys; Configuration Traversal; Network Sniffing; Input Capture; Discovery; Process Discovery; Remote System Discovery; Port Scanning; System Information Discovery; User Discovery; Lateral Movement; Exploitation of Remote Services; Collection; Database Access; Exfiltration; Command and Control; Malicious Behaviors; Coin Mining; Traffic Hijacking; Info Stealing; Ransom; DDoS; RAT; Backdoor; and HackTool.

Accordingly, the disclosed techniques for providing a smart proxy for a large scale high-interactive honeypot farm facilitate providing a highly scalable honeypot farm solution that can be deployed anywhere and is easy and safe to use. The sensors disclosed herein provide easy to use, lightweight and universal sensor deployments. These techniques for the honeypot farm are safe and avoid potential harms that can result if deploying high-interactive honeypots in a customer network/infrastructure.

Moreover, the disclosed honeypot farm provides a highly interactive honeypot solution and is very customizable (e.g., configurable and customizable for specific services/devices used in a given customer's enterprise computing network environment). Also, the disclosed honeypot farm is automatically scalable (e.g., to handle burst traffic). Further, the disclosed honeypot farm can detect unknown threats and 0-day exploits and can also effectively and efficiently simulate various IoT devices and their vulnerabilities as similarly described above.

Finally, the disclosed honeypot farm provides significant security/threat intelligence and visibility. For example, providing significant intelligence via associations among multiple attacks or with external knowledge can be provided (e.g., whether this is generic/massive/trivial attacks or likely a targeted/unknown operation). The security/threat intelligence can be actionable, and the disclosed honeypot farm can facilitate enhanced security/threat protection (e.g., generating actionable items or automatically generating rules to enhance firewall/security device protections for network-based firewalls and/or host-based endpoints providing threat/security protections).

Example Data Appliance Hardware Environment

Figure 6:
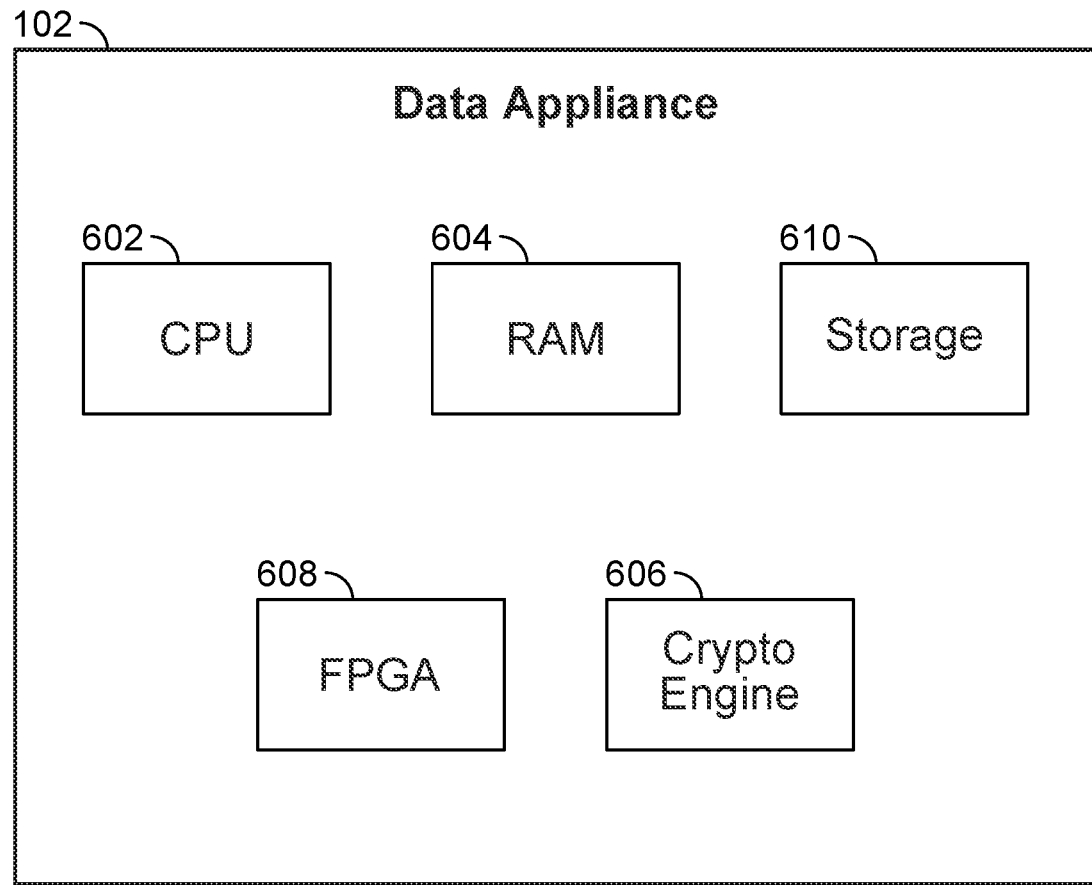
FIG. 6 illustrates a data appliance in accordance with some embodiments.

FIG. 6 illustrates a data appliance in accordance with some embodiments. The example shown is a representation of physical components that are included in data appliance 102, in some embodiments. Specifically, data appliance 102 (e.g., a device that performs various security related functions, such as a security device, which can be in the form of, for example, a security appliance, security gateway, security server, and/or another form of a security device) includes a high performance multi-core CPU 602 and RAM 604. Data appliance 102 also includes a storage 610 (such as one or more hard disks), which is used to store policy (e.g., layer-3 through layer-7 firewall and/or routing rules, such as destination IP-based routing rules, firewall rules, etc.) and other configuration information. Data appliance 102 can also include one or more optional hardware accelerators. For example, data appliance 102 can include a cryptographic (crypto) engine 606 that can perform encryption and decryption operations, and one or more FPGAs 608 that can perform matching, act as network processors, and/or perform other tasks.

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to system 102 as applicable.

Example Data Appliance Logical Architecture

Figure 7:
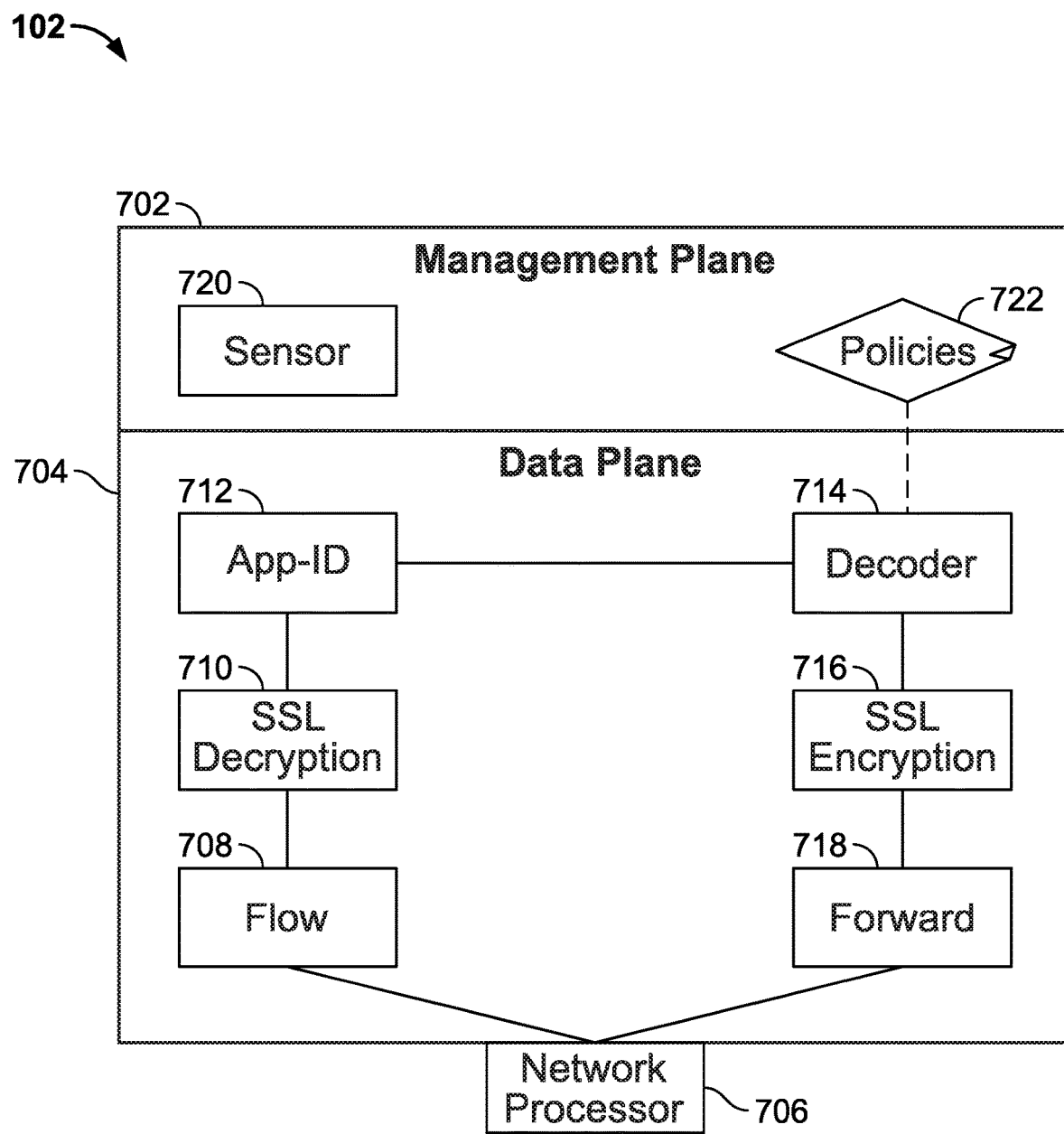
FIG. 7 is a block diagram illustrating an example logical architecture of a data appliance for providing a honey network in accordance with some embodiments.

FIG. 7 is a block diagram illustrating an example logical architecture of a data appliance for providing a honey network in accordance with some embodiments. As discussed above with respect to FIG. 7, devices can be located and operating within an enterprise secured network environment. Devices accessing other devices within the enterprise network and/or accessing the Internet and various web sites or web services (e.g., Microsoft Office Online®, SalesForce.com, Apps.gov, Google® search and/or services, Facebook®, Skype®, and various other online resources) available via the Internet do so through the security infrastructure of the enterprise security network, such as through the enterprise firewall/security appliance shown as a data appliance 102.

Referring to FIG. 7, the example shown is a representation of logical components that can be included in data appliance 102. As shown, data appliance 102 includes a management plane 702 and a data plane 704. In one embodiment, the management plane is generally responsible for managing user interactions, such as by providing a user interface for configuring policies and viewing log data. The data plane is generally responsible for managing data, such as by performing packet processing and session handling.

Suppose a device attempts to access a server 720 using an encrypted session protocol, such as SSL. Network processor 706 is configured to receive packets from the device and provide the packets to data plane 704 for processing. Flow 708 identifies the packets as being part of a new session and creates a new session flow. Subsequent packets will be identified as belonging to the session based on a flow lookup. If applicable, SSL decryption is applied by SSL decrypter 710, and similarly traffic can be encrypted using SSL encrypter 716. Otherwise, processing by SSL decrypter 710 is omitted. Application identification (App-ID) component 712 is configured to determine what type of traffic the session involves and to identify a user associated with the traffic flow. For example, App-ID 712 can recognize a GET request in the received data and conclude that the session requires an HTTP decoder (e.g., to decode a web session in this example). For each type of protocol that can be decoded by data appliance 102, there exists a corresponding decoder 714. In one embodiment, the application identification is performed by an application identification component (e.g., App-ID engine) shown as App-ID 712, and a user identification is performed by another function/engine (e.g., a User-ID engine can be provided as another component of data appliance 102). Based on the determination made by App-ID 712, the packets are sent to an appropriate decoder 714. Decoder 714 is configured to assemble packets (e.g., which may be received out of order) into the correct order, perform tokenization, and extract out information. Decoder 714 also performs signature matching to determine what should happen to the packet. Processed packets can then be forwarded to a destination (e.g., depending on the applied policy (722)) using forward component 718.

As also shown in FIG. 7, a sensor 720 for monitoring and forwarding live attack traffic on the enterprise network is also provided in data appliance 102. For example, the sensor can perform the functions as similarly discussed above with respect to FIGS. 1 and 2.

As an example, based on a policy configured in policies 722 (e.g., which can include a honeypot policy, such as identifying which types of traffic to forward to the cloud honeypot), malware destined to a target device during a web session can be forwarded to the cloud security service along with various additional/contextual information to implement the disclosed techniques for providing a smart proxy for a large scale high-interaction honeypot farm, such as described above and further described below.

Figure 8:
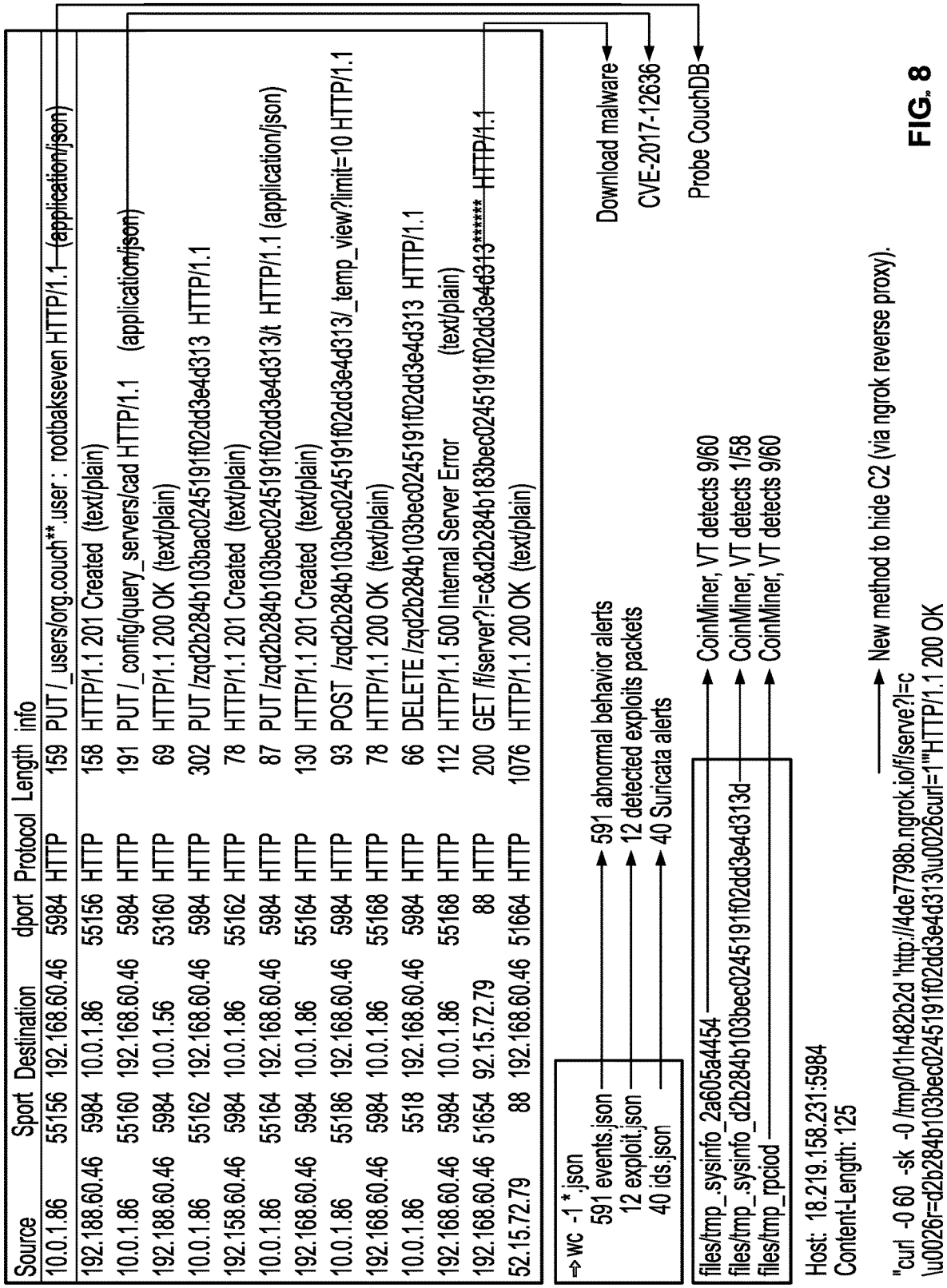
FIG. 8 is an example attack that was successfully detected using the large scale high-interactive honeypot in accordance with some embodiments.

Example Attacks Detected Using the Disclosed Large Scale High-Interactive Honeypot Farm FIG. 8 is an example attack that was successfully detected using the large scale high-interactive honeypot in accordance with some embodiments. In this example attack session, the attacker first sends the probing payload to check whether the CouchDB service is running on the host. If there is no correct response from the CouchDB service, then the attack will not send the following attack payload. However, because our high-interactive honeypot farm has the CouchDB vulnerable resource, this probing traffic is forwarded to the CouchDB resource, and the HTTP 201 response is returned. As such, the attacker proceeds to send the second payload, which is actually the remote code execution exploit (CVE-2017-12636) to compromise the CouchDB service. During this example attack session, the disclosed large scale high-interactive honeypot farm successfully alerts 591 abnormal behaviors, and identifies 12 exploit packets and 40 IDS alerts. Meanwhile, three malware samples, belonging to the CoinMiner family, and a new C2 domain are captured by the disclosed large scale high-interactive honeypot farm.

Figure 9:
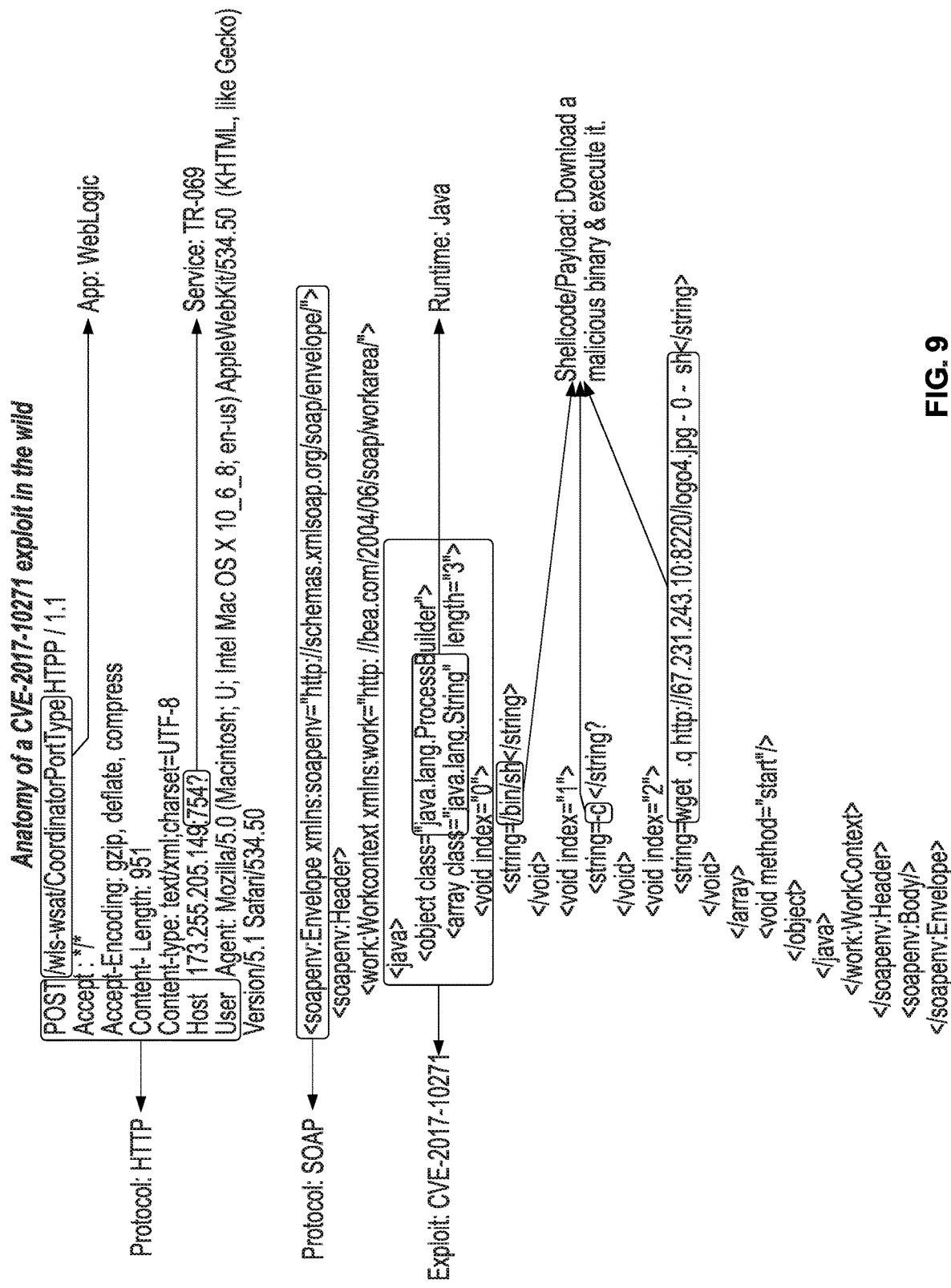
FIG. 9 is an anatomy of an example of a CVE exploit in the wild captured using the large scale high-interactive honeypot farm in accordance with some embodiments.

FIG. 9 is an anatomy of an example of a CVE exploit in the wild captured using the large scale high-interactive honeypot farm in accordance with some embodiments. In this example, the disclosed large scale high-interactive honeypot farm successfully captures an attack using the CVE-2017-10271 exploit in the wild. From the attack payload, the smart proxy in the disclosed large scale high-interactive honeypot farm can identify that this traffic is related to the HTTP protocol, the WebLogic application, the TR-069 service, the SOAP protocol, the Java runtime, and one vulnerable environment (CVE-2017-10271). After the matching operation is performed using the disclosed matching techniques, the smart proxy forwards the traffic to the WebLogic resource, and the final shellcode payload is executed. As such, the disclosed large scale high-interactive honeypot farm can capture the shellcode and the downloaded malicious binary.

Figure 10:
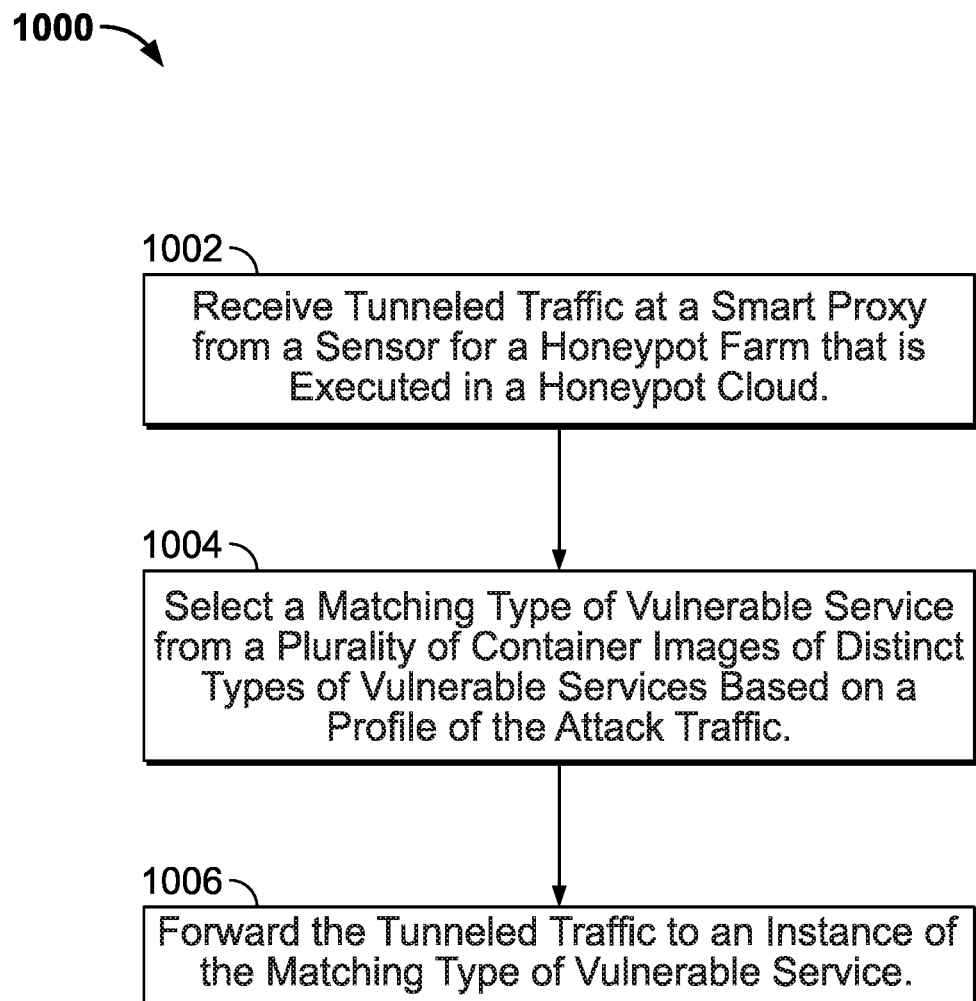
FIG. 10 is a flow diagram illustrating a process for a smart proxy for a large scale high-interactive honeypot farm in accordance with some embodiments.

Example Processes for a Smart Proxy for a Large Scale High-Interactive Honeypot Farm FIG. 10 is a flow diagram illustrating a process for a smart proxy for a large scale high-interactive honeypot farm in accordance with some embodiments. In one embodiment, process 1000 is performed using the system architectures described above (e.g., such as described above with respect to FIGS. 1, 2, and 5). The process begins at 1002 when tunneled traffic is received at a smart proxy from a sensor for a honeypot farm that is executed in a honeypot cloud. In one embodiment, the tunneled traffic is forwarded attack traffic, and the honeypot farm includes a plurality of container images of distinct types of vulnerable services.

In one embodiment, the sensor is an agent executed on a network device and/or a server, and the server is located on the Internet or in an enterprise network. In one embodiment, the smart proxy is located in a cloud network of a security service provider, and the sensor and a plurality of other sensors are located in different geographic locations on one or more other enterprise networks and/or the Internet.

At 1004, a matching type of vulnerable service is selected from a plurality of container images of distinct types of vulnerable services based on a profile of the attack traffic. In one embodiment, the smart proxy is a stateful proxy that performs deep packet inspection (DPI) of the tunneled traffic for generating the profile of the attack traffic and implementing a contextual-based analysis for selecting a matching type of vulnerable service from the plurality of container images of distinct types of vulnerable services based on the profile of the attack traffic including one or more of the following: destination port, payload DPI results, source IP reputation and attacking history, payload history and similarity, and/or randomization, such as similarly described above with respect to FIGS. 1-5.

At 1006, the tunneled traffic is forwarded to an instance of the matching type of vulnerable service. In one embodiment, an orchestration manager is executed in the honeypot cloud for managing the plurality of container images of distinct types of vulnerable services.

Figure 11:
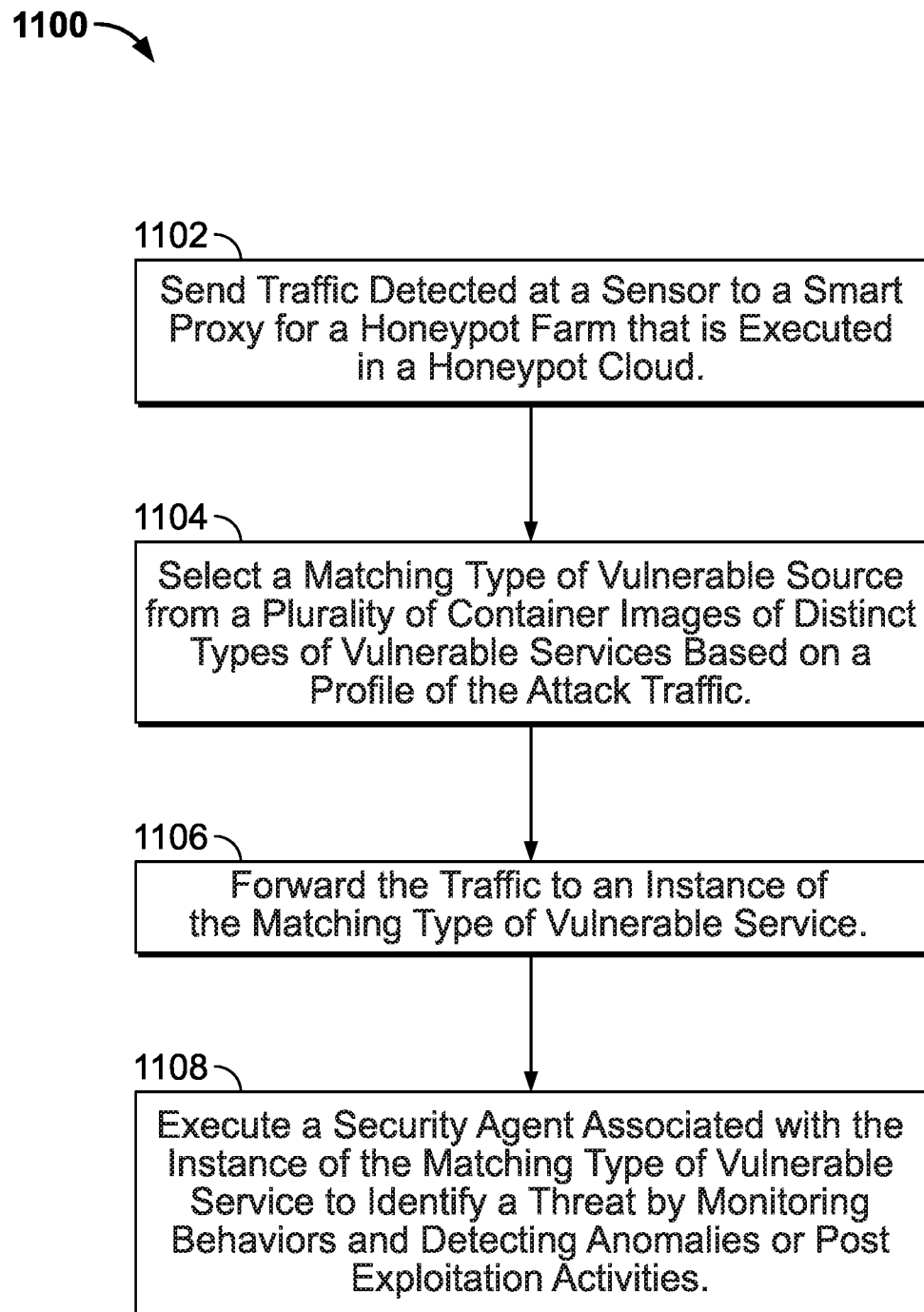
FIG. 11 is a flow diagram illustrating a process for providing a large scale high-interactive honeypot farm in accordance with some embodiments.

FIG. 11 is a flow diagram illustrating a process for providing a large scale high-interactive honeypot farm in accordance with some embodiments. In one embodiment, process 1100 is performed using the system architectures described above (e.g., such as described above with respect to FIGS. 1, 2, and 5). The process begins at 1102 when traffic detected at a sensor is sent to a smart proxy for a honeypot farm that is executed in a honeypot cloud. In one embodiment, the traffic is forwarded attack traffic that is sent using a tunneling protocol, and the honeypot farm includes a plurality of container images of distinct types of vulnerable services.

In one embodiment, the sensor is an agent executed on a network device and/or a server, and the server is located on the Internet or in an enterprise network. In one embodiment, the smart proxy is located in a cloud network of a security service provider, and the sensor and a plurality of other sensors are located in different geographic locations on one or more other enterprise networks and/or the Internet.

At 1104, a matching type of vulnerable service is selected from a plurality of container images of distinct types of vulnerable services based on a profile of the attack traffic. In one embodiment, the smart proxy is a stateful proxy that performs deep packet inspection (DPI) of the tunneled traffic for generating the profile of the attack traffic and implementing a contextual-based analysis for selecting a matching type of vulnerable service from the plurality of container images of distinct types of vulnerable services based on the profile of the attack traffic including one or more of the following: destination port, payload DPI results, source IP reputation and attacking history, payload history and similarity, and/or randomization, such as similarly described above with respect to FIGS. 1-5.

At 1106, the traffic is forwarded to an instance of the matching type of vulnerable service. In one embodiment, an orchestration manager is executed in the honeypot cloud for managing the plurality of container images of distinct types of vulnerable services.

At 1108, a security agent associated with the instance of the matching type of vulnerable service is executed to identify a threat by monitoring behaviors and detecting anomalies or post exploitation activities. For example, the security agent can be implemented using a hybrid host-based and network-based IDS agent as similarly described above with respect to FIG. 5.

In one embodiment, the instance of the matching type of vulnerable service can include a security agent that identifies a threat by monitoring behaviors and detecting anomalies or post exploitation activities. For example, the honeypot farm can be executed in the honeypot cloud that is located in a cloud network of a security service provider, and the security service provider provides an interface for accessing a threat report generated based on monitoring behaviors and detecting anomalies or post exploitation activities.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:
1. A system comprising:
a processor configured to:
receive tunneled traffic at a smart proxy from a sensor for a honeypot farm that is executed in a honeypot cloud, wherein the tunneled traffic is forwarded attack traffic, and wherein the honeypot farm includes a plurality of container images of distinct types of vulnerable services, wherein the plurality of container images of distinct types of vulnerable services includes a first container image of a first type of vulnerable service and a second container image of a second type of vulnerable service;
select a matching type of vulnerable service from the plurality of container images of distinct types of vulnerable services based on a profile of the attack traffic, wherein the smart proxy is a stateful proxy that performs deep packet inspection (DPI) of the traffic for generating the profile of the attack traffic and implementing a contextual-based analysis for selecting the matching type of vulnerable service from the plurality of container images of distinct types of vulnerable services based on the profile of the attack traffic including one or more of the following: payload DPI results, source IP reputation and attacking history, payload history and similarity, and/or randomization, and wherein the selecting of the matching type of vulnerable service comprises to:
select the matching type of vulnerable service from the first container image of the first type of vulnerable service or the second container image of the second type of vulnerable service; and
forward the tunneled traffic to an instance of the matching type of vulnerable service; and
a memory coupled to the processor and configured to provide the processor with instructions.

2. The system recited in claim 1, wherein the sensor is an agent executed on a network device and/or a server, and wherein the server is located on the Internet or in an enterprise network.

3. The system recited in claim 1, wherein the smart proxy is located in a cloud network of a security service provider, and wherein the sensor and a plurality of other sensors are located in different geographic locations on one or more other enterprise networks and/or the Internet.

4. The system recited in claim 1, wherein the smart proxy is located in a cloud network of a security service provider.

5. The system recited in claim 1, wherein an orchestration manager is executed in the honeypot cloud for managing the plurality of container images of distinct types of vulnerable services.

6. The system recited in claim 1, wherein the instance of the matching type of vulnerable service includes a security agent that identifies a threat by monitoring behaviors and detecting anomalies or post exploitation activities.

7. The system recited in claim 1, wherein the honeypot farm is executed in the honeypot cloud that is located in a cloud network of a security service provider, and wherein the security service provider provides an interface for accessing a threat report generated based on monitoring behaviors and detecting anomalies or post exploitation activities.

8. A method of synchronizing a honey network configuration to reflect a target network environment, comprising:
receiving tunneled traffic at a smart proxy from a sensor for a honeypot farm that is executed in a honeypot cloud, wherein the tunneled traffic is forwarded attack traffic, and wherein the honeypot farm includes a plurality of container images of distinct types of vulnerable services, wherein the plurality of container images of distinct types of vulnerable services includes a first container image of a first type of vulnerable service and a second container image of a second type of vulnerable service;
selecting a matching type of vulnerable service from the plurality of container images of distinct types of vulnerable services based on a profile of the attack traffic, wherein the smart proxy is a stateful proxy that performs deep packet inspection (DPI) of the traffic for generating the profile of the attack traffic and implementing a contextual-based analysis for selecting the matching type of vulnerable service from the plurality of container images of distinct types of vulnerable services based on the profile of the attack traffic including one or more of the following: payload DPI results, source IP reputation and attacking history, payload history and similarity, and/or randomization, and wherein the selecting of the matching type of vulnerable service comprises:
selecting the matching type of vulnerable service from the first container image of the first type of vulnerable service or the second container image of the second type of vulnerable service; and
forwarding the tunneled traffic to an instance of the matching type of vulnerable service.

9. The method of claim 8, wherein the sensor is an agent executed on a network device and/or a server, and wherein the server is located on the Internet or in an enterprise network.

10. The method of claim 8, wherein the smart proxy is located in a cloud network of a security service provider, and wherein the sensor and a plurality of other sensors are located in different geographic locations on one or more other enterprise networks and/or the Internet.

11. A computer program product, the computer program product being embodied in a tangible computer readable storage medium and comprising computer instructions for:
receiving tunneled traffic at a smart proxy from a sensor for a honeypot farm that is executed in a honeypot cloud, wherein the tunneled traffic is forwarded attack traffic, and wherein the honeypot farm includes a plurality of container images of distinct types of vulnerable services, wherein the plurality of container images of distinct types of vulnerable services includes a first container image of a first type of vulnerable service and a second container image of a second type of vulnerable service;
selecting a matching type of vulnerable service from the plurality of container images of distinct types of vulnerable services based on a profile of the attack traffic, wherein the smart proxy is a stateful proxy that performs deep packet inspection (DPI) of the traffic for generating the profile of the attack traffic and implementing a contextual-based analysis for selecting the matching type of vulnerable service from the plurality of container images of distinct types of vulnerable services based on the profile of the attack traffic including one or more of the following: payload DPI results, source IP reputation and attacking history, payload history and similarity, and/or randomization, and wherein the selecting of the matching type of vulnerable service comprises:
selecting the matching type of vulnerable service from the first container image of the first type of vulnerable service or the second container image of the second type of vulnerable service; and
forwarding the tunneled traffic to an instance of the matching type of vulnerable service.

12. The computer program product recited in claim 11, wherein the sensor is an agent executed on a network device and/or a server, and wherein the server is located on the Internet or in an enterprise network.

13. The computer program product recited in claim 11, wherein the smart proxy is located in a cloud network of a security service provider, and wherein the sensor and a plurality of other sensors are located in different geographic locations on one or more other enterprise networks and/or the Internet.

* * * * *

UNITED STATES PATENT AND TRADEMARK OFFICE
CERTIFICATE OF CORRECTION

| | |
|---|---|
| PATENT NO. | : 11,271,907 B2 |
| APPLICATION NO. | : 16/721628 |
| DATED | : March 8, 2022 |
| INVENTOR(S) | : Zihang Xiao, Cong Zheng and Jiangxia Liu |

Page 1 of 1

It is certified that error appears in the above-identified patent and that said Letters Patent is hereby corrected as shown below:

In the Specification

In Column 9, Line(s) 27, delete "PUP" and insert --PHP--, therefor.
In Column 16, Line(s) 51, delete "PUP" and insert --PHP--, therefor.
In Column 21, Line(s) 15, delete "HID S" and insert --HIDS--, therefor.

Signed and Sealed this
Twelfth Day of September, 2023

Katherine Kelly Vidal
*Director of the United States Patent and Trademark Office*